3,277,094
PIPERAZINE DERIVATIVES
Lincoln Harvey Werner, Summit, N.J., assignor to CIBA Corporation, New York, N.Y., a corporation of Delaware
No Drawing. Filed May 10, 1965, Ser. No. 454,703
22 Claims. (Cl. 260—268)

This is a continuation-in-part of my application Serial No. 395,007, filed September 8, 1964, which in turn is a continuation-in-part of my application Serial No. 376,572, filed June 19, 1964, now abandoned, which in turn is a continuation-in-part of my application Serial No. 317,130, filed October 18, 1963 (now abandoned).

The present invention concerns and has for its object the provision of acylated aryl ethers and methods for their preparation.

More particularly the invention relates to N-(acyl-phenyl-X-lower alkyl)-N'-monocyclic aryl-diaza-cycloalkanes, especially to those of the formula:

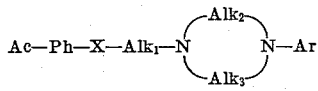

in which Ac stands for the acyl radical of an organic carboxylic acid, Ph for a phenylene radical, X for an oxygen or sulfur atom, $Alk_1$ for lower alkylene separating X from the nitrogen atom by at least two carbon atoms, each of $Alk_2$ and $Alk_3$ for lower alkylene separating the two nitrogen atoms by two to three carbon atoms, and Ar for a monocyclic aryl group, carbonyl derivatives, N-oxides, quaternary ammonium derivatives and salts of these compounds.

The acyl group Ac is primarily the radical of an aliphatic carboxylic acid, particularly lower alkanoyl, especially acetyl, as well as formyl, propionyl or n-butyryl, but also lower alkenoyl, e.g. acrylyl, or the acyl radical of a substituted aliphatic carboxylic acid, for example, of a carbocyclic aryl-aliphatic carboxylic acid, such as phenyl-lower alkanoyl or alkenoyl e.g. phenylacetyl, 3-phenyl-propionyl or cinnamoyl, or substituted phenyl-lower alkanoyl or alkenoyl such as (lower alkyl)-phenyl-lower alkanoyl or alkenoyl, e.g. 4-methyl-phenylacetyl or 4-methyl-cinnamoyl, (lower alkoxy)-phenyl-lower alkanoyl or alkenoyl, e.g. 4-methoxy-phenylacetyl, 3,4,5-trimethoxy-phenylacetyl, 4-methoxy-cinnamoyl or 3,4,5-trimethoxy-cinnamoyl, (halogeno)-phenyl-lower alkanoyl or alkenoyl, e.g. 4-chloro-phenylacetyl, 3-(4-fluoro-phenyl)-propionyl, 4-fluoro-cinnamoyl or 4-chloro-cinnamoyl as well as the radical of a heterocyclic aryl-aliphatic carboxylic acid, such as pyridyl-lower alkanoyl or alkenoyl, e.g. 2-pyridyl-acetyl, 3-(3-pyridyl)-propionyl or 3-(3-pyridyl)-acrylyl.

Other acyl radicals Ac are those of aromatic carboxylic acids, especially those of monocyclic carbocyclic aryl carboxylic acids, for example benzoyl or substituted benzoyl, such as (lower alkyl)-benzoyl, e.g. 4-methyl-benzoyl, (lower alkoxy)-benzoyl, e.g. 4-methoxy-benzoyl, or (halogeno)-benzoyl, e.g. 4-fluoro-benzoyl or 4-chloro-benzoyl, as well as the acyl radicals of monocyclic heterocyclic aryl carboxylic acids, for example a pyridoyl or substituted pyridoyl radical, such as nicotinoyl, isonicotinoyl or (lower alkyl)-pyridoyl, e.g. 2-methyl-isonicotinoyl. One or more than one of the same or of different acyl radicals may be substituting any of the positions available for substitution in the phenylene radical Ph.

Apart from acyl, the phenylene radical Ph may contain one or more than one of the same or of different additional substituents attached to any of the positions available for substitution. Such additional substituents are particularly etherified hydroxy, especially lower alkoxy, e.g. methoxy, ethoxy, n-propoxy, isopropoxy or n-butoxy, as well as lower alkyl, having preferably from one to four carbon atoms, e.g. methyl, ethyl, n-propyl, isopropyl, n-butyl, isobutyl or tertiary butyl, esterified hydroxy, particularly halogeno having preferably an atomic weight between 19 and 80 both included, such as fluoro, chloro or bromo.

The group X is above all an oxygen atom but may also be a sulfur atom.

The lower alkylene portion $Alk_1$ has preferably from two to seven carbon atoms and separates X from the nitrogen atom by two to seven carbon atoms. It is, for example, represented by unbranched lower alkylene, i.e. 1,2-ethylene, 1,3-propylene, 1,4-butylene, 1,5-pentylene, 1,6-hexylene or 1,7-heptylene but may also be represented by branched lower alkylene, e.g. 1,2- or 2,3-propylene, 1,3- or 2,4-butylene, 1,3-, 1,4- or 2,4-pentylene, 1,5-hexylene, 1,5- or 2,6-heptylene.

Each of the lower alkylene groups $Alk_2$ and $Alk_3$ has preferably also from two to seven, more especially two to three, carbon atoms, and separates the two nitrogen atoms by two to three carbon atoms. These alkylene radicals are, above all, represented by 1,2-ethylene, as well as by 1,2- or 1,3-propylene, but also by 1,2- or 2,3-butylene, 1,2-isobutylene, 1,2- or 2,3-pentylene, 1,2-isopentylene or 3-methyl-1,2-isopentylene, 1,2- or 3,4-hexylene or 1,2-heptylene.

The monocyclic aryl group Ar stands primarily for monocyclic carbocyclic aryl i.e. phenyl or substituted phenyl having one or more than one of the same or of different substituents attached to any of the positions available for substitution. Such substituents are particularly lower alkyl, e.g. methyl, ethyl, n-propyl or isopropyl, etherified hydroxy or mercapto, especially lower alkoxy or lower alkylmercapto, e.g. methoxy, ethoxy, n-propoxy or isopropoxy; methyl- or ethylmercapto, esterified hydroxy, especially halogeno, e.g. fluoro, chloro or bromo.

A monocyclic aryl group Ar stands also for monocyclic heterocyclic aryl, especially monocyclic azacyclic aryl, particularly pyridyl, e.g. 2-, 3- or 4-pyridyl, as well as for monocyclic oxacyclic or thiacyclic aryl, such as furyl, e.g. 2-furyl, or thienyl, e.g. 2-thienyl.

The compounds of this invention may also be in the form of carbonyl derivatives, which are preferably those containing at least one nitrogen atom, such as imines, especially aliphatic imines in which the aliphatic radical stands above all for lower alkyl, but also for cycloalkyl or cycloalkyl-lower alkyl having from three to eight, especially from five to seven, ring carbon atoms, e.g. cyclopropyl, cyclopentyl, cyclohexyl, cycloheptyl, cyclooctyl, cyclopropylmethyl, cyclopentylmethyl, 2-cyclopentylethyl, cyclohexylethyl, 1 or 2-cyclohexylethyl, or cycloheptyl-methyl; oximes, O-lower alkyloximes, hydrazones, mono- or di-lower alkylhydrazones, or semicarbazones; the lower alkyl group therein contains up to seven carbon atoms and has been exemplified under the phenylene radical Ph.

N-oxides are especially in the form of acid addition salts, such as those of pharmaceutically acceptable acids.

Quaternary ammonium derivatives are those with reactive esters formed by alcohols and strong acids, particularly those with lower alkyl halides, e.g. methyl, ethyl, n-propyl or isopropyl chloride, bromide or iodide, phenyl-lower alkyl halides, e.g. benzyl chloride, benzyl bromide or 2-phenylethyl bromide, di-lower alkyl sulfates, e.g. dimethyl or diethyl sulfate, lower alkyl lower alkane sufonates, e.g. methyl or ethyl methane or ethane sulfonate, or lower alkyl monocyclic carbocyclic aryl sulfonates, e.g. methyl p-toluene sulfonate. Also included as quaternary ammonium compounds are the quaternary ammonium hydroxides. Mono- or poly-quaternary ammonium compounds may be formed, depending on the conditions of the quaternization reaction.

The compounds of this invention exhibit valuable pharmacological properties. For example, they show an outstanding antihypertensive activity and are, therefore, useful in the treatment of hypertensive conditions, such as essential hypertension and the like. The compounds are orally active, their antihypertensive effects are of prolonged duration and are accompanied by little or no side effects, e.g. tachycardia and the like.

In pharmacological tests with dogs, it has been shown that they block the pressor effects of epinephrine and norepinephrine, as well as the pressor effects caused by carotid occlusion.

It has also been found that the compounds of this invention increase blood flow, particularly the peripheral blood flow, as well as the renal blood flow; they are, therefore, also useful in the treatment of peripheral vascular diseases, e.g. Reynaud's disease and the like.

The compounds of this invention also have antifibrillatory and antiarrhythmic effects, and are useful in the treatment of heart fibrillations and arrhythmias of neurogenic or cardiogenic, auricular or ventricular nature. The antifibrillatory properties exhibited by the compounds of this invention are of prolonged nature.

Furthermore, compounds of this invention also show antihistaminic properties and are, therefore, useful as antihistaminic agents in the treatment of allergic disorders and the like.

Compounds of this invention also exhibit anti-inflammatory effects, and are, therefore, useful as anti-inflammatory agents, for example, in place of corticoid steroids, e.g. cortisone, hydrocortisone and the like, in the treatment of tissue inflammations, such as arthritic inflammations and similar conditions.

Especially useful are the compounds of the formula

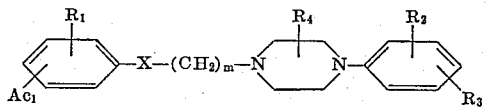

in which $Ac_1$ is primarily lower alkanoyl, as well as benzoyl, phenyl-lower alkanoyl, phenyl-lower alkenoyl or pyridoyl, each of the groups $R_1$, $R_2$ and $R_3$ is hydrogen, lower alkyl, lower alkoxy or halogeno, X is primarily oxygen, as well as sulfur, the letter $m$ is an integer from two to six, and $R_4$ is hydrogen or methyl, lower alkylimines, the oxime, O-lower alkyloximes, the hydrazone and semicarbazone thereof and the acid addition salts of these compounds.

Particularly outstanding pharmacological properties are exhibited by the compounds of the formula

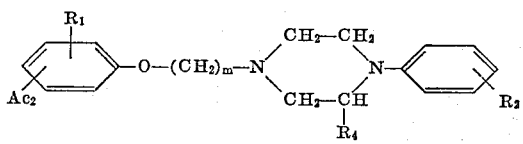

in which $Ac_2$ is lower alkanoyl, especially acetyl, $R_1$, $R_2$ and $R_4$ have the previously-given meaning, $R_1$ primarily is lower alkoxy and $R_4$ hydrogen, the letter $m$ has the previously-given meaning, but stands, above all, for one of the integers from 2 to 4, lower alkylimines thereof and pharmaceutically acceptable acid addition salts of these compounds.

The compounds of this invention are prepared according to known methods. For example, they are obtained by (a) reacting an N-monocyclic aryl-diaza-cycloalkane, especially that of the formula

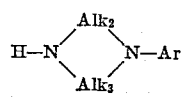

with a reactive ester of an acyl-phenyl-X-lower alkanol, particularly such derived from the alcohol having the formula

or (b) reacting an acyl-phenyl-X-lower alkylamine, especially that of the formula

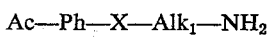

with a reactive diester of an N,N-bis-(hydroxy-lower alkyl)-N-monocyclic arylamine, particularly such derived from the compound having the formula

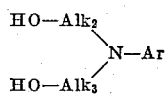

or (c) reacting a monocyclic arylamine, especially that of the formula

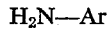

with a reactive diester of an N,N-bis-(hydroxy-lower alkyl)-N-(acyl-phenyl-X)-lower alkylamine, particularly such derived from the compound having the formula

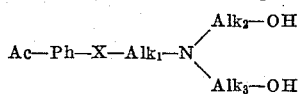

or (d) reacting an N-(acyl-phenyl-X-lower alkyl)-N'-monocyclic arylalkylenediamine, especially that of the formula

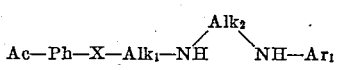

with a reactive diester of a lower alkylenediol, particularly such derived from the diol of the formula

and if desired, converting the acyl group in a resulting compound into another acyl group, and/or converting a resulting compound into a ketone derivative and/or an N-oxide or a quaternary ammonium compound thereof and/or converting a resulting basic compound into a salt thereof and/or converting a resulting salt into the basic compound or into another salt and/or separating a resulting mixture of isomers into the single isomers.

Reaction (a) may also be carried out with a metal salt of an N-monocyclic aryl-diaza-cycloalkane, such as an alkali metal, e.g., lithium, sodium or potassium salt. It is prepared according to known methods; for example, a solution of the N-monocyclic aryl-diaza-cycloalkane in a suitable solvent or solvent mixture, the selection of which depends on the solubility of the starting material and the reactivity of the salt-forming reagent, is treated with an alkali metal, e.g. sodium, or with an alkali metal hydride or amide, e.g. lithium, sodium or potassium hydride or amide, with an alkali metal carbonate, e.g. sodium or potassium carbonate, or an alkali metal lower alkoxide, if necessary, while cooling or heating, and/or in the atmosphere of an inert gas, e.g. nitrogen. A metal salt-forming reagent may also be added to a mixture of the two reactants, preferably a solution thereof, thus forming the salt in situ and bringing about the desired reaction.

A reactive ester of an acyl-phenyl-X-lower alkanol is primarily an ester thereof with a strong inorganic acid, particularly a hydrohalic acid, e.g. hydrochloric or hydrobromic acid, as well as sulfuric acid, or a strong organic sulfonic acid, e.g. methane or p-toluene sulfonic acid. The preferred starting materials are represented by the acyl-phenyl-X-lower alkyl halides, in which lower alkyl separates the group X from halogeno by at least two carbon atoms, and halogeno stands particularly for chloro or bromo.

Reaction (a) is carried out according to known methods. Thus, whenever the free N-monocyclic aryl-diaza-cycloalkane is used, the generated acid is preferably neutralized by adding an excess of this starting material, or any other base, such as the salt-forming reagent, e.g. sodium or potassium carbonate. The reaction is preferably performed in the presence of a diluent, for example an ether, e.g. tetrahydrofuran, p-dioxane or diethyleneglycol dimethylether, a formamide, e.g. dimethylformamide, a hydrocarbon, e.g. benzene, or an alcohol, e.g. ethanol, if necessary, while cooling or preferably at an elevated temperature, in an open or closed vessel and/or in the atmosphere of an inert gas, e.g. nitrogen.

The starting materials used in the above reaction are known or if new, may be prepared according to known methods. Thus, a phenol or thiophenol compound is acylated by treatment with an organic carboxylic acid halide, particularly the chloride, in the presence of a Friedel-Crafts reagent, e.g. aluminum chloride, and the acylated phenol or thiophenol, or preferably a salt, particularly an alkali metal salt, thereof is then reacted with a reactive ester of a halogeno-lower alkanol, in which halogeno is separated from reactive esterified hydroxy by at least two carbon atoms, for example, with a corresponding lower alkylene halide, in which the two halogens are of the same or of different atomic weights.

The reactive diester used in reaction (b) is primarily that of a hydrohalic acid having preferably a molecular weight between 36 and 81 both inclusive, i.e. that of hydrochloric or hydrobromic acid, as well as that of an organic sulfonic acid. The reaction is carried out according to known conditions, such as described before, if necessary, at an elevated temperature, in a closed vessel, in the atmosphere of an inert gas, e.g. nitrogen, and/or in the presence of an acid neutralizing base.

The starting materials used in the above reaction are prepared according to known methods; for example, the previously-described reactive ester of an acyl-phenyl-X-lower alkanol, when treated with ammonia or with another reagent capable of converting a reactive esterified hydroxyl group into amino, such as an alkali metal salt of phthalimide, followed by hydrazine, may be converted into the desired starting material.

Reaction (c) is also carried out according to known methods, such as those mentioned hereinbefore. The reactive diester of an N,N-bis-(hydroxy-lower alkyl)-N-(acyl-phenyl-X)-lower alkylamine, is obtained, for example, by treating a reactive ester of a corresponding acyl-phenyl-X-lower alkanol, with an N,N-di-(hydroxy-lower alkyl)-amine, and converting in the resulting N,N-bis-(hydroxy-lower alkyl)-N-(acyl-phenyl-X)-lower alkylamine the free hydroxyl groups into reactive esterified hydroxyl groups, such as halogeno, e.g. chloro or bromo, for example, by treatment with a thionyl halide, e.g. thionyl chloride, or a phosphorus halide, e.g. phosphorus tribromide, or into organic sulfonyloxy groups, e.g. methylsulfonyloxy or p-toluene-sulfonyloxy, for example, by treatment with an organic sulfonic acid halide, e.g. methane or p-toluene sulfonyl chloride.

Reaction (d) also is carried out according to known methods, such as the previously shown procedures. The starting materials are prepared according to any of the known methods useful for the preparation of asymmetrically N,N'-disubstituted alkylenediamines.

In a resulting compound, an acyl group may be converted into another acyl group, for example, by treatment of a resulting compound having a lower alkanoyl substituent, particularly acetyl, with an aldehyde, such as an aliphatic aldehyde, e.g. a lower alkanal, or a carbocyclic aryl carboxaldehyde, e.g. benzaldehyde, a carbocyclic aryl-aliphatic aldehyde, e.g. phenylacetaldehyde, or a heterocyclic aryl carboxaldehyde, e.g. nicotinaldehyde, in the presence of a suitable base. Acyl radicals of unsaturated organic carboxylic acids, such as lower alkenoyl, phenyl-lower alkenoyl or pyridyl-lower alkenoyl radicals, may be converted into the acyl radicals of the corresponding saturated organic carboxylic acids by reduction, for example that carried out with catalytically activated hydrogen.

The free keto-compounds of the invention can be converted into carbonyl derivatives, especially into nitrogen-containing carbonyl derivatives, according to methods known per se. Thus, for example, a compound containing a free keto group attached to the phenylene radical Ph, can be reacted with compounds containing a primary amino group, such as primary amines, especially primary lower alkyl amines, e.g. methylamine, ethylamine, propylamine, isopropylamine, or n-butylamine, in order to form imines; with hydroxylamine to form oximes, which latter may be etherified, for example with lower alkyl halides, to form O-lower alkyloximes; with hydrazine or asymmetrical substituted hydrazines, especially lower alkyl hydrazines or N,N-di-lower alkylhydrazines, to form hydrazones; or with semicarbazide to form semicarbazones.

N-oxides of the invention can also be prepared according to known methods. For example, a resulting free compound, preferably a solution thereof in an inert solvent, can be reacted with an N-oxidizing reagent, such as, for example, hydrogen peroxide, ozone, persulfuric acid, or an organic peracid, such as an organic percarboxylic acid, e.g. peracetic, perbenzoic or monoperphthalic acid, or an organic persulfonic acid, to form the corresponding N-oxide. A resulting N-oxide may be converted into an acid addition salt thereof according to the method described below.

Quaternary ammonium derivatives of this invention are obtained according to known methods, for example, by reacting the free compound with an ester of an alcohol and a strong inorganic or organic acid, such as one of those previously mentioned. The quaternizing reaction may be performed in the presence or absence of a solvent, if necessary, while cooling or at an elevated temperature, in a closed vessel, and/or in the atmosphere of an inert gas, e.g. nitrogen.

Resulting quaternary ammonium compounds may be converted into other quaternary ammonium compounds, such as the corresponding quaternary ammonium hydroxides, according to known methods. The latter, for example, are obtained by reacting a quaternary ammonium halide with silver oxide, or a quaternary ammonium salt with an anion exchange preparation or by electrodialysis. From a resulting quaternary ammonium hydroxide, there can be prepared a quaternary ammonium salt by reaction with an acid or with a lower alkyl sulfate, e.g. methyl or ethyl sulfate. A quaternary ammonium salt is also converted directly into another quaternary ammonium salt without the formation of an intermediary quaternary ammonium hydroxide; for example, a quaternary ammonium iodide may be reacted with freshly prepared silver chloride or with hydrogen chloride in anhydrous methanol, to yield the quaternary ammonium chloride, or a quaternary ammonium salt may be treated with an anion exchange preparation and thus be converted into another quaternary ammonium salt. Quaternary ammonium compounds may be isolated in the form of hydrates or may contain solvent of crystallization.

A resulting basic compound can be converted into its acid addition salt according to known methods, such as reacting it with an acid, such as one of the inorganic or organic acids mentioned below, for example, by treating a solution of the base in a solvent or solvent mixture with the acid or a solution thereof, or with an anion exchange preparation, and isolating the desired salt. The mono- or poly-salts may also be obtained in the form of hydrates thereof or may contain solvent of crystallization.

A resulting acid addition salt may be converted into the free compound according to known methods, for example, by treatment with a base, such as a metal hydroxide, e.g. lithium, sodium, potassium or calcium hydroxide, a metal carbonate, e.g. sodium or potassium carbonate or hydrogen carbonate, ammonia, or with a hydroxyl ion exchange preparation.

A resulting acid addition salt may be converted into another salt according to known methods, for example, by treatment of a salt with an anion exchange preparation. Furthermore, a salt with an inorganic acid may be treated with a metal, e.g. sodium, barium or silver salt of an acid in the presence of an appropriate solvent, for example, a solvent, in which a resulting inorganic compound in insoluble and is thus removed from the reaction medium, to yield another acid addition salt.

A resulting mixture of isomers may be separated into single isomers. For example, a mixture of diastereoisomeric compounds may be separated into the individual racemic compounds on the basis of physico-chemical differences, such as solubility, for example, by fractional crystallization. Racemates may be resolved into the optically active d- and l-forms according to known resolution procedures, for example, reacting the free compound, preferably a solution thereof, with one of the optically active forms of an acid having an asymmetric carbon atom or a solution thereof. The resulting mixture of acid addition salts is then separated into the single acid addition salts of optically active compounds on the basis of physico-chemical differences, e.g. solubility, and the free and optically active base is liberated from the resulting salt according to the previously-described procedure, and may be converted into another acid addition salt, an N-oxide, an acid addition salt of an N-oxide or a quaternary ammonium compound according to the above-described methods. In view of the close relationship between the free compounds and the compounds in the form of their salts, whenever a free compound is referred to in this context, a corresponding salt, especially a pharmaceutically acceptable salt, is also intended, provided such is possible or appropriate under the circumstances.

Salts of the free compounds of this invention are acid addition salts, preferably such that are pharmaceutically acceptable, derived for example, of inorganic acids, e.g. hydrochloric, hydrobromic, nitric, sulfuric or phosphoric acid or organic acids, such as organic carboxylic aids, e.g. acetic, propionic, glycolic, malonic, succinic, maleic, hydroxymaleic, fumaric, malic, tartaric, citric, glucuronic, benzoic, salicylic, 4-amino-salicylic, 2-acetoxybenzoic, pamoic, nicotinic or isonicotinic acid, or organic sulfonic acids, e.g. methane sulfonic, ethane sulfonic, 2-hydroxyethane sulfonic, ethane 1,2-disulfonic, benzene sulfonic, toluene sulfonic or naphthalene 2-sulfonic acid. Acid addition salts also may serve as intermediates for the preparation of other salts, such as the pharmaceutically acceptable, non-toxic acid addition salts, or in the purification of the free compounds, as well as for identification and characterization purposes. Acid addition salts primarily used for the latter purpose are, for example, those with certain inorganic acids, e.g. perchloric phosphotungstic, phosphomolybdic, chloroplatinic or Reinecke acid or those with acidic organic nitro compounds, e.g. picric, picrolonic or flavianic acid.

The invention also comprises any modification of the process wherein a compound obtainable as an intermediate at any stage of the process is used as the starting material and the remaining step(s) of the process is (are) carried out or the process is discontinued at any stage thereof, or in which the starting materials are formed under the reaction conditions or in which the reaction components are used in the form of their salts, as well as any new intermediates.

In the process of this invention such starting materials are preferably used which lead to final products mentioned in the beginning as preferred embodiments of the invention.

The new compounds of this invention are useful in the form of compositions for enteral, e.g. oral, or parenteral administration, comprising essentially a pharmacologically effective amount of one of the compounds of this invention, in admixture with a pharmaceutically acceptable, organic or inorganic, solid or liquid carrier, which usually represents the major portion by weight of such compositions. These preparations are in solid form, e.g. as capsules, tablets or dragees or in liquid form, e.g. as solutions, suspensions or emulsions. Suitable carrier materials are, for example, starches, e.g. corn, wheat or rice starch, sugars, e.g. lactose, sucrose or glucose, stearic acid or salts thereof, e.g. magnesium or calcium stearate, stearyl alcohol, talc, gums, acacia, tragacanth, polyalkylene glycols, propylene glycol, water and the like. The quantity and the nature of the carrier ingredients may vary widely and depend inter alia upon the desired physical appearance or size of the composition or method of manufacture. Encapsulation may be effected using, if desired, the same excipients as those used for tablets. If necessary, the compositions having as the effective pharmacological ingredient one of the compounds of this invention, may contain other auxiliary substances, such as preserving, stabilizing, wetting, emulsifying, coloring or flavoring agents, salts for varying the osmotic pressure, or buffers. They may also contain, in combination, other therapeutically useful substances. The compounding of the formulations is generally carried out in the manner normally employed in the art, i.e. by manufacturing a mixture or a granulate. Any compatible color, approved and certified under the provisions of the Federal Food, Drug and Cosmetic Law may be used for aesthetic purposes or as a means of identification.

The following examples are intended to illustrate the invention and are not to be construed as being limitations thereon.

*Example 1*

A mixture of 5.0 g. of 4-(4-bromo-butyloxy)-3-methoxy-acetophenone in 25 ml. of ethanol and 5.4 g. of 1-phenyl-piperazine is refluxed for twenty-four hours. After cooling, the resulting solution is filtered and concentrated under reduced pressure. The residue is partitioned between water and diethyl ether. The organic phase is washed twice with water, dried and concentrated to yield 6.4 g. of 1-[4-(4-acetyl-2-methoxy-phenyloxy)-butyl]-4-phenyl-piperazine of the formula

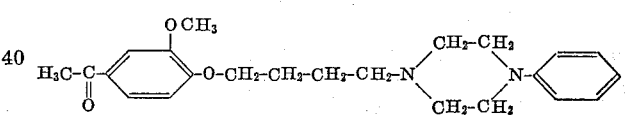

which is dissolved in ethyl acetate. On addition of a solution of anhydrous hydrogen chloride in ethyl acetate, the 1-[4-(4-acetyl-2-methoxy-phenyloxy)-butyl]-4-phenyl-piperazine dihydrochloride precipitates and is recrystallized from ethanol, M.P. 205° (dec.).

The starting material is prepared as follows: To a solution of 8.0 g. of sodium hydroxide in 100 ml. of ethanol, prepared at an elevated temperature, is added 33.2 g. of 4-acetyl-2-methoxy-phenol in 120 ml. of ethanol. The sodium salt of the 4-acetyl-2-methoxy-phenol precipitates immediately, and a solution of 86.4 g. of 1,4-dibromo-butane in 90 ml. of ethanol is added. The reaction mixture is refluxed for nineteen hours, then cooled to room temperature and filtered. The filtrate is concentrated, and on standing a solid material, representing 1,4-bis-(4-acetyl-2-methoxy-phenyloxy)-butane, precipitates, which is filtered off and discarded. The filtrate is concentrated to dryness under reduced pressure; the residue is taken up in diethyl ether and the organic solution is washed with dilute aqueous sodium hydroxide and water, dried and evaporated. The residue is distilled and the 4-(4-bromo-butyloxy)-3-methoxy-acetophenone is collected at 168–172°/1 mm.; yield: 15.7 g.

*Example 2*

A mixture of 5.2 g. of 4-(4-bromo-butyloxy)-3-methoxy-acetophenone and 6.1 g. of 1-(3-methyl)-piperazine in 25 ml. of ethanol is reacted as described in Example 1 to yield 4.9 g. of 1-[4-(4-acetyl-2-methoxy-phenyloxy)- butyl]-4-(3-methylphenyl)-piperazine dihydrochloride of the formula

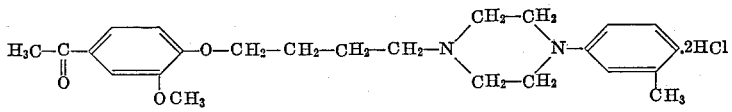

which melts at 188–191° (with decomposition) after two recrystallizations from isopropanol.

Example 3

A mixture of 4.6 g. of 4-(2-chloro-ethyloxy)-3-methoxy-acetophenone and 6.5 g. of 1-phenyl-piperazine in 25 ml. of ethanol is refluxed for twenty-four hours. After cooling and standing at room temperature, 2.85 g. of 1-phenyl-piperazine hydrochloride crystallizes and is filtered off; the filtrate is concentrated under reduced pressure and the residue is partitioned between diethyl ether and water. The organic phase is separated, washed twice with water, dried and concentrated. The residue, weighing 7.5 g. and containing the 1-[2-(4-acetyl-2-methoxy-phenyloxy)-ethyl]-4-phenyl-piperazine of the formula

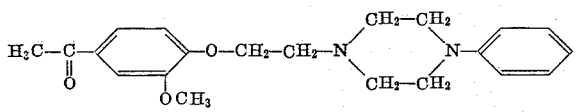

is dissolved in ethyl acetate and treated with a concentrated solution of anhydrous hydrogen chloride in ethyl acetate. The 1-[2-(4-acetyl-2-methoxy-phenyloxy)-ethyl]-4-phenyl-piperazine dihydrochloride precipitates, is filtered off and is recrystallized from ethanol, M.P. 200° (with decomposition).

The starting material used in the above procedure is prepared as follows: By using 33.2 g. of 4-acetyl-2-methoxyphenol in 120 ml. of ethanol, 8.0 g. of sodium hydroxide in 100 ml. of ethanol and 43 g. of 2-chloro-ethyl bromide in 40 ml. of ethanol and carrying out the reaction as described in Example 1, but omitting the distillation step, 23.5 g. of 3-(2-chloroethyloxy)-3-methoxy-acetophenone is obtained, which melts at 69–70° after recrystallization from a mixture of ethanol and petroleum ether.

Example 4

A mixture of 5.6 g. of 4-(2-chloro-ethyloxy)-3-methoxy-acetophenone and 8.6 g. of 1-(2-methyl-phenyl)-piperazine in 25 ml. of ethanol is refluxed for twenty-four hours and worked up as described in Example 3. The resulting 4-[2-(4-acetyl - 2-methoxy-phenyloxy)-ethyl]-1-(2-methyl-phenyl)-piperazine of the formula

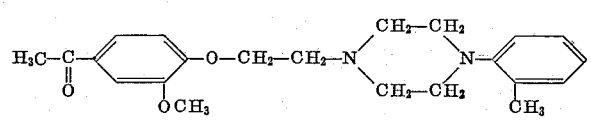

is converted into its dihydrochloride, which melts at 200–203° (with decomposition).

Example 5

A mixture of 5.6 g. of 4-(2-chloro-ethyloxy)-3-methoxy-acetophenone and 8.5 g. of 1-(3-methyl-phenyl)-piperazine in 25 ml. of ethanol is reacted as described in Example 3 to yield the 4-[2-(4-acetyl-2-methoxy-phenyloxy)-ethyl]-4-(3-methyl-phenyl piperazine of the formula

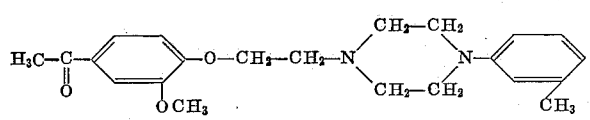

which is converted into its dihydrochloride, melting at 182–186° after two recrystallizations from isopropanol.

Example 6

A mixture 5.6 g. of 4-(2-chloro-ethyloxy)-3-methoxy-acetophenone in 25 ml. of ethanol and 9.6 g. of 1-(2-chlorophenyl)-piperazine is refluxed for twenty-four hours and then concentrated under reduced pressure. The residue is partitioned between diethyl ether and water, and the organic phase is separated, dried and evaporated under reduced pressure. The residue is dissolved in ethyl acetate, and the 1-[2-(4-acetyl-2-methoxy-phenyloxy)-ethyl]-4 - (2-chloro-phenyl)-piperazine hydrochloride of the formula

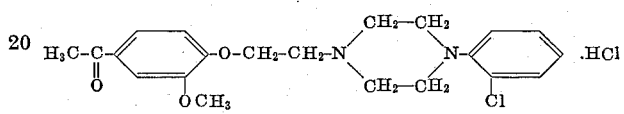

precipitates by adding a saturated solution of hydrogen chloride in ethyl acetate. It is filtered off and partitioned between water and chloroform. The organic solution is separated and concentrated; the residue is treated with acetone to yield the crystalline hydrochloride salt, which melts at 173–175° after recrystallization from isopropanol.

Example 7

A solution of 6.3 g. of 4-(5-bromo-pentyloxy)-3-methoxy-acetophenone and 6.5 g. of 1-phenyl-piperazine in 20 ml. of ethanol is refluxed for 24 hours. The reaction mixture is cooled to room temperature, filtered and concentrated under reduced pressure. The residue is dissolved in diethyl ether, the organic solution is washed with water, dried and concentrated under reduced pressure. The resulting 1-[5-(4-acetyl - 2-methoxy-phenyloxy)-pentyl]-4-phenyl-piperazine of the formula

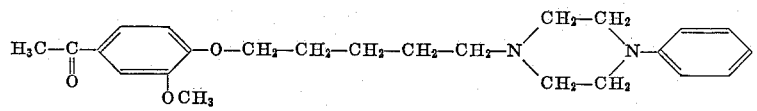

is dissolved in ethyl acetate and treated with a saturated solution of hydrogen chloride in ethyl acetate. The resulting 1-[5-(4-acetyl-2-methoxy-phenyloxy)-pentyl]-4-phenyl-piperazine dihydrochloride is filtered off and recrystallized twice from ethanol, M.P. 185° (with decomposition); yield; 6.3 g.

The starting material used in the above procedure is prepared as follows: To a solution of 5.32 g. of sodium hydroxide in 70 ml. of ethanol is added a solution of 22.0 g. of 4-acetyl-2-methoxy-phenol in 80 ml. of ethanol, and then a solution of 45.9 g. of 1,5-dibromo-pentane in 50 ml. of ethanol. The reaction mixture is refluxed for sixteen hours, and, after standing at room temperature for several hours, it is filtered, and the filtrate is concentrated under reduced presure. The residue is taken up in chloroform; the solid material is filtered off and the filtrate is washed with a 1 N aqueous solution of sodium hydroxide. After drying, the organic solution is concentrated, and the resulting 4-(5-bromo-pentyloxy) - 3-methoxy-acetophenone is purified by distillation and collected at 198–202°/1.5 mm.; yield: 150.0 g.; it solidifies on standing M.P. 54–60°.

*Example 8*

A mixture of 6.6 g. of 4-(6-bromohexyloxy)-3-methoxy-acetophenone and 6.5 g. of 1-phenyl-piperazine in 33 ml. of ethanol is reacted as described in Example 7. The resulting 1 - [6 - (4 - acetyl - 2 - methoxy phenyloxy)-hexyl]-4-phenyl-piperazine of the formula

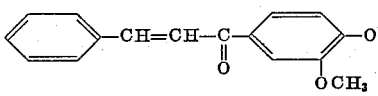

is converted into its dihydrochloride, which melts at 175–178° (with decomposition) after two recrystallizations from ethanol; yield: 7.7 g.

The starting material used in the above procedure is prepared by adding to a solution of 12.0 g. of sodium hydroxide in 150 ml. of ethanol, 49.9 g. of 4-acetyl-2-methoxy-phenol in 180 ml. of ethanol and reacting the resulting mixture with 109.8 g. of 1,6-dibromohexane in 100 ml. of ethanol according to the procedure described in Example 7; the resulting 4-(6-bromohexyloxy)-3-methoxy-acetophenone is purified by distillation and collected at 192°/0.05 mm.; yield: 31.7 g.

*Example 9*

A solution of 6.0 g. of 4-(4-bromo-butyloxy)-3-methoxy-benzalacetophenone and 5.2 g. of 1-phenyl-piperazine in 30 ml. of ethanol is refluxed for 24 hours and the reaction mixture is worked up as described in Example 7 to yield the 1-[4-(4-cinnamoyl-2-methoxy-phenyloxy)-butyl]-4-phenyl-piperazine of the formula

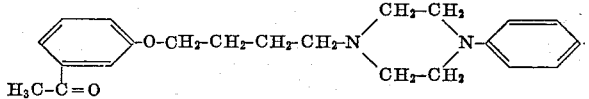

which is converted into its dihydrochloride, M.P. 160° (with decomposition) after four recrystallizations from isopropanol; yield: 2.8 g.

The above 1 - [4 - (4 - cinnamoyl - 2 - methoxy-phenyloxy)-butyl]-4-phenyl-piperazine, when treated with catalytically activated hydrogen, yields the 1-{4-[2-methoxy - 4 - (3 - phenyl - propionyl) - phenyloxy] - butyl}-4-phenyl-piperazine. The starting material used in the above procedure is prepared as follows: To a solution of 0.94 g. of sodium hydroxide in 10 ml. of water is added a solution of 5.4 g. of 4-(4-bromobutyloxy)-3-methoxy-acetophenone in 25 ml. of ethanol. While stirring, 1.9 g. of benzaldehyde is added; stirring at room temperature is then continued for one hour. The desired product separates as an oil, which is isolated by decanting the supernatant liquid, treated with water and dissolved in diethyl ether. The organic solution is dried and evaporated to yield 6.0 g. of the oily (4-(4-bromo-butyloxy)3-methoxy-benzalacetophenone, which solidifies after standing for several days, but is used without further purification.

The following compounds are prepared according to the previously described procedure:

1 - {4 - [4 - (4 - chloro-cinnamoyl) - 2 - methoxy-phenyloxy] - butyl} - 4 - phenyl - piperazine, the dihydrochloride of which melts at 198° (with decomposition), and which is prepared by reacting 4-(4-bromo-butyloxy)-3-methoxy-(4-chloro-benzal)-acetophenone, M.P. 95–97°, and 1-phenyl-piperazine;

4 - phenyl - 1 - {2 - methoxy - 4 - [4 - (3,4,5-trimethoxy-cinnamoyl) - phenyloxy] - butyl} - piperazine, the dihydrochloride of which melts at 153° (with decomposition), and which is prepared by reacting 4-(4-bromo-butyloxy)-3 - methoxy - (3,4,5 - trimethoxy - benzal) - acetophenone, M.P. 107–109°, with 1-phenyl-piperazine; and 1 - [2 - (4 - cinnamoyl - 2 - methoxy - phenyloxy)-ethyl]-4-phenyl-piperazine, the dihydrochloride of which melts at 246° (with decomposition), and which is prepared by reacting 4-(2 - chloro - ethyloxy) - 3 - methoxy-benzalacetophenone, M.P. 110–112°, with 1-phenyl-piperazine.

*Example 10*

A solution of 5.4 g. of 3-(4-bromo-butyloxy)-acetophenone and 5.5 g. of 1-phenyl-piperazine in 30 ml. of ethanol is refluxed for 24 hours and is then worked up as described in Example 7 to yield the 1-[4-(3-acetyl-phenyloxy) - butyl] - 4 - phenyl - piperazine of the formula

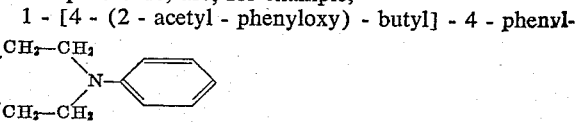

which is converted into its dihydrochloride, M.P. 185° (with decomposition); yield: 4.9 g.

The starting material used in the above procedure is prepared by reacting 18.1 g. of 2-hydroxy-acetophenone in 100 ml. of ethanol with 5.3 g. of sodium hydroxide in 70 ml. of ethanol and then with 43.0 g. of 1,4-di-bromo-butane in 50 ml. of ethanol according to the procedure described in Example 7; the desired 3-(4-bromo-butyloxy)-acetophenone is purified by distillation and collected at 152–156°/1.0 mm.; yield: 14.0 g.

Other compounds, which are prepared according to the above procedure, are, for example, 1 - [4 - (2 - acetyl - phenyloxy) - butyl] - 4 - phenyl-piperazine, the dihydrochloride of which melts at 185–190° (with decomposition), and which is prepared by reacting 2 - (4 - bromo - butyloxy) - acetophenone, B.P. 152°/0.8 mm., with 1-phenyl-piperazine;

1-[4-(4-acetyl-phenyloxy)-butyl]-4-phenyl - piperazine, the dihydrochloride of which melts at 201–205° (with decomposition), and which is prepared by reacting the 4-(4-bromo-butyloxy)-acetophenone with 1-phenyl-piperazine (the starting material is prepared as follows: A mixture of 27.3 g. of 4-hydroxy-acetophenone in 100 ml. of N,N-dimethylformamide and 9.4 g. of a 53 percent suspension of sodium hydride in mineral oil is stirred and then treated with 80.0 g. of 1,4-dibromobutane. The temperature is kept between 45° and 50° for sixteen hours and after cooling, the solid material is filtered off and the filtrate is evaporated under reduced pressure. The residue is partitioned between diethyl ether and water; the organic phase is washed with water, dried and concentrated to yield the 4-(4-bromo-butyloxy)-acetophenone, which is distilled and collected at 160–170°/1.0 mm., and extracted with hexane to remove residual amounts of mineral oil, yield: 33 g.);

1-[2-(4-acetyl-phenyloxy)-ethyl]-4-phenyl - piperazine, the dihydrochloride of which melts at 200° (with decomposition), and which is prepared by reacting 4-(2-chloroethyloxy)-acetophenone, B.P. 140°/0.7 mm. with 1-phenyl-piperazine;

1-[2-(4-benzoyl-phenyloxy)-ethyl]-4-phenyl-piperazine, the dihydrochloride of which melts at 196–198° (with decomposition), and which is prepared by reacting 4-(2-chloro-ethyloxy)-benzophenone with phenyl-piperazine (the starting material is prepared by reacting 19.8 g. of 4-hydroxy-benzophenone in 170 ml. of N,N-dimethyl-formamide with 4.5 g. of 53 percent suspension of sodium hydride in mineral oil and then with 22.0 g. of 1-bromo-2-chloroethane according to the above described procedure; the 4-(2-chloro-ethyloxy)-benzophenone melts at 73°; yield: 6.0 g.); and 4-phenyl-1-[4-(4-phenylacetyl-phenyloxy)-butyl]-piperazine, the dihydrochloride of which melts at 188° (with decomposition), and which is prepared by reacting benzyl 4-(4-bromo-butyloxy)-phenyl ketone, M.P. 87–91°, with 1-phenyl-piperazine.

*Example 11*

A mixture of 5.7 g. of 4-(4-bromo-butyloxy)-2-methyl-acetophenone and 6.5 g. of 1-phenyl-piperazine in 30 ml. of ethanol is refluxed for 24 hours and worked up as described in Example 7 to yield 1-[4-(4-acetyl-3-methyl-phenyloxy)-butyl]-4-phenyl-piperazine of the formula

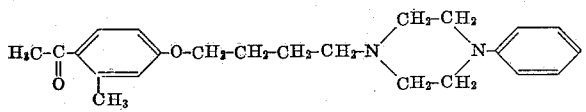

which is converted into its dihyrochloride, M.P. 190–193°; yield: 5.7 g.

The starting material used in the above procedure is prepared as follows: To a solution of 5.32 g. of sodium hydroxide in 70 ml. of ethanol is added a solution of 20.0 g. of 4-hydroxy-2-methyl-acetophenone in 100 ml. of ethanol and then 43.0 g. of 1,4-dibromobutane in 50 ml. of ethanol. The reaction mixture is refluxed for sixteen hours and worked up as described in Example 7 to yield 16.5 g. of 4-(4-bromo-butyloxy)-2-methyl-acetophenone, which is collected at 162–164°/0.7 mm.

*Example 12*

The reaction of 5.7 of 4-(4-bromo-butyloxy)-3-methoxy-benzaldehyde with 6.5 g. of 1-phenyl-piperazine in 20 ml. of ethanol, when carried out as described in Example 7 yields the 1-[4-(4-formyl-2-methoxy-phenyloxy)-butyl]-4-phenyl-piperazine of the formula

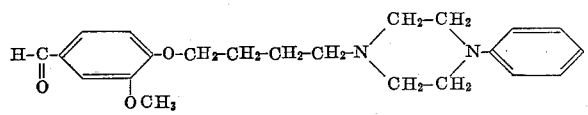

which is converted into the dihydrochloride, M.P. 158° (with decomposition); yield: 2.8 g.

The starting material is prepared according to the procedure described in Example 11, by substituting 20.0 g. of vanilline for the 4-hydroxy-2-methyl-acetophenone; the desired 4-(4-bromo-butyloxy)-3-methoxy-benzaldehyde is collected at 164–166°/0.2 mm.

*Example 13*

A mixture of 9.9 g. of 4-(4-bromo-butyloxy)-3-methoxy-n-butyrophenone, 9.7 g. of 1-phenyl-piperazine and 50 ml. of ethanol is refluxed for 18 hours. After cooling and standing, the crystallized 1-phenyl-piperazine hydrobromide is filtered off, and the filtrate is concentrated under reduced pressure. The residue is taken up into diethyl ether; the organic solution is washed with water, dried and concentrated. The resulting 1-[4-(4-butyryl-2-methoxy-phenyloxy)-butyl]-4-phenyl-piperazine of the formula

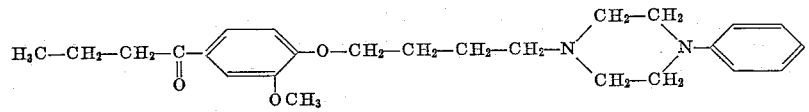

is dissolved in ethyl acetate and treated with a solution of hydrogen chloride in ethyl acetate; the resulting dihydrochloride salt is filtered off and recrystallized twice from ethanol, M.P. 188–190° (with decomposition); yield: 8.2 g.

The starting material is prepared as follows: A solution of 15.0 g. of 4-hydroxy-3-methoxy-n-butyrophenone in 50 ml. of ethanol is added to 3.0 g. of sodium hydroxide in 40 ml. of ethanol while stirring, and the resulting mixture is treated with 22.0 g. of 1,4-dibromobutane in 25 ml. of ethanol. The reaction mixture is refluxed for 3½ hours while stirring; the pH is about 6. After cooling and filtering, the solution is evaporated under reduced pressure. The residue is taken up in diethyl ether, the organic solution is washed with water and a dilute aqueous solution of sodium hydroxide, dried and concentrated. The desired 4-(4-bromo-butyloxy)-3-methoxy-n-butyrophenone is isolated by distilling the residue and recovered at 180–190°/0.2 mm.; yield: 13.0 g.

*Example 14*

A mixture of 7.18 g. of 4-(4-bromo-butylmercapto)-acetophenone and 8.1 g. of 1-phenyl-piperazine in 50 ml. of ethanol is refluxed for 18 hours. After cooling, the reaction mixture is filtered, the solid material is washed with ethyl acetate, and the combined organic solutions are concentrated under reduced pressure. The residue is dissolved in ethyl acetate; the organic solution is washed with water, dried and concentrated under reduced pressure to yield 8.5 g. of 1-[4-(4-acetyl-phenylmercapto)-butyl]-4-phenyl-piperazine of the formula

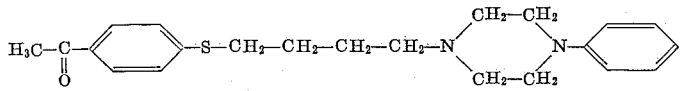

which is converted into its dihydrochloride by dissolving the free base in ethyl acetate and treating it with a solution of hydrogen chloride in ethyl acetate. It is recrystallized twice from a mixture of methanol and ethyl acetate and melts at 186–190°; yield: 6.1 g.

The starting materials used in the above procedure is prepared as follows: A soultion of 22.0 g. of thiophenol in 100 ml. of ethanol is added to 8.0 g. sodium hydroxide in 100 ml. of ethanol, followed by a solution of 60.0 g. of 1,4-dibromobutane in 60 ml. of ethanol. The reaction mixture is refluxed for one hour, then allowed to stand overnight at room temperature, filtered and concentrated. The residue is dissolved in diethyl ether; the organic solution is washed with 2 N aqueous sodium hydroxide and water, dried and concentrated. The residue is distilled and the desired 4-bromo-butylmercapto-benzene is collected at 120°/1.0 mm.

To a cold (0–10°) suspension of 16.0 g. of anhydrous aluminum chloride in 65 ml. of chloroform, is added 10.2 g. of acetyl chloride; while keeping the temperature at 1–5°, a total of 24.5 g. of 4-bromo-butylmercapto-benzene is added slowly. The reaction mixture is allowed to warm to room temperature and is then stirred for thirty minutes and poured onto ice. The chloroform layer is separated, washed with water, dried and concentrated. The desired 4-(4-bromo-butylmercapto) - acetophenone is obtained by distilling the residue and collected at 180°/0.5 mm.; yield: 15.0 g.

*Example 15*

A mixture of 6.9 g. of 4-(4-bromobutyloxy)-3-methoxy-acetophenone and 8.8 g. of 1-(2-methoxy-phenyl)-piperazine in 30 ml. of ethanol is refluxed for 24 hours and is worked up as described in Example 7 to yield the 1-[4-

(4-acetyl-2-methoxy-phenyloxy) - butyl] - 4 - (2-methoxy-phenyl)-piperazine of the formula

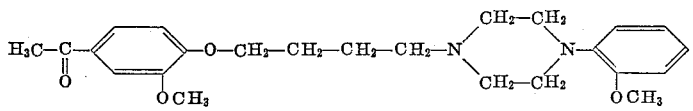

which is converted into its dihydrochloride, M.P. 200° (with decomposition) after two recrystallizations from ethanol.

Other compounds prepared according to the above illustrated procedure by selecting the appropriate starting materials are, for example, 1 - [2-(4-acetyl-2-methoxy - phenyloxy) - ethyl] - 4 - (2-methoxy - phenyl) - piperazine, the dihydrochloride of which melts at 188° (with decomposition), and which is prepared by reacting 4-(2-chloroethyloxy)-3-methoxy-acetophenone with 1-(2-methoxy-phenyl)-piperazine;

1-[3-(4-acetyl-2-methoxy - phenyloxy) - propyl] - 4 - (2-methoxy - phenyl) - piperazine, the dihydrochloride of which melts at 222–225° (with decomposition), and which is prepared by reacting 4-(3-bromo-propyloxy)-3-methoxy-acetophenone with 1-(2-methoxy-phenyl)-piperazine;

1-[5-(4-acetyl-2-methoxy - phenyloxy) - pentyl] - 4 - (2-methoxy - phenyl) - piperazine, the dihydrochloride of which melts at 178–181° (with decomposition), and which is prepared by reacting 4-(5-bromo-pentyloxy)-3-methoxy-acetophenone with 1-(2-methoxy-phenyl)-piperazine;

1 - [4 - (2 - acetyl - phenyloxy) - butyl] - 4 - (2 - methoxy - phenyl) - piperazine, the dihydrochloride of which melts at 198–200° (with decomposition), and which is prepared by reacting 2-(4-bromo-butyloxy)-acetophenone with 1-(2-methoxy-phenyl)-piperazine;

1 - [4 - (3 - acetyl - phenyloxy) - butyl] - 4 - (2 - methoxy - phenyl) - piperazine, the dihydrochloride of which melts at 189–192° (with decomposition), and which is prepared by reacting 3-(4-bromo-butyloxy)-acetophenone with 1-(2-methoxy-phenyl)-piperazine;

1 - [4 - (4 - acetyl - phenyloxy) - butyl] - 4 - (2 - methoxy - phenyl) - piperazine, the dihydrochloride of which melts at 216–220° (with decomposition), and which is prepared by reacting 4-(4-bromo-butyloxy)-acetophenone with 1-(2-methoxy-phenyl)-piperazine;

1 - [4 - (4 - cinnamoyl - 2 - methoxy) - butyl] - 4 - (2-methoxy-phenyl)-piperazine; the dihydrochloride of which melts at 178–182° (with decomposition), and which is prepared by reacting 4 - (4 - bromo - butyloxy) - 3 - methoxy-benzalacetophenone with 1-(2-methoxy-phenyl)-piperazine;

1 - [4 - (4 - acetyl - 2 - chloro - phenyloxy) - butyl]-4 - (2 - methoxy-phenyl)-piperazine, the dihydrochloride of which melts at 212° (with decomposition), and which is prepared by reacting 4-(4-bromo-butyloxy)-3-chloro-acetophenone with 1-(2-methoxy-phenyl)-piperazine;

1 - [4 - (4 - acetyl - 2 - methoxy - phenyloxy) - butyl]-4 - (2 - methyl - phenyl) - piperazine, the monohydrochloride of which melts at 172–174°, and which is prepared by reacting 4 - (4 - bromo-butyloxy) - 3 - methoxy-acetophenone with 1-(2-methyl-phenyl)-piperazine;

1 - [4 - (4 - acetyl - 2 - methoxy - phenyloxy) - butyl]-4 - (2 - chloro - phenyl) - piperazine, the monohydrochloride of which melts at 160–162° and which is prepared by reacting 4-(4-bromo-butyloxy)-3-methoxy-acetophenone with 1-(2-chloro-phenyl)-piperazine;

1 - [4 - (4 - acetyl - 2 - ethoxy - phenyloxy) - butyl]-4 - (2 - methoxy-phenyl)-piperazine, which is characterized as the hydrochloride salt and prepared by reacting 4-(4-bromo-butyloxy)-3-ethoxy-acetophenone with 1-(2-methoxy-phenyl)-piperazine; and 1 - [4 - (2 - methoxy - 4 - propionyl-phenyloxy)-butyl]-4 - (2 - methoxy-phenyl)piperazine, which is characterized as the hydrochloride salt and prepared by reacting 4 - (4 - bromo - butyloxy) - 3 - methoxy - propiophenone and 1-(2-methoxy-phenyl)-piperazine.

*Example 16*

A mixture of 18.0 g. of 1-[4-(4-acetyl-2-methoxy-phenyloxy)-butyl]-4-phenyl - piperazine dihydrochloride and 350 ml. of water is stirred. After five minutes, the solid material is filtered off; it represents the 1-[4-(4-acetyl - 2 - methoxy - phenyloxy) - butyl] - 4 - phenyl-piperazine monohydrochloride monohydrate, M.P. 95–98°; yield: 15.0 g. The dried monohydrochloride monohydrate is dissolved in 50 ml. of ethanol by heating; the solution is diluted with 50 ml. of ethyl acetate, whereupon the anhydrous 1-[4-(4-acetyl-2-methoxy-phenyloxy)-butyl]-4-phenyl-piperazine monohydrochloride of the formula

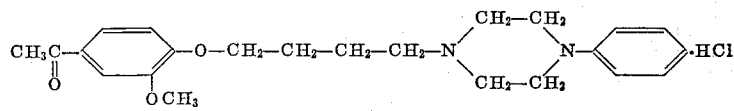

crystallizes, M.P. 153–154°. A solution of 0.76 g. of 1 - [4 - (4 - acetyl - 2 - methoxy - phenyl) - butyl] - 4-phenyl-piperazine, which is obtained from the dihydrochloride by treatment with a base and melts at 74–76°, in 2 ml. of ethanol, when treated with 0.53 ml. of a 3.5 N solution of hydrogen chloride in ethyl acetate and diluted with diethyl ether, yields 0.6 g. of 1-[4-(4-acetyl-2-methoxy - phenyloxy) - butyl] - 4 - phenyl - piperazine monohydrochloride, M.P. 152°.

The picrate of 1-[4-(4-acetyl-2-methoxy-phenyloxy)-butyl]-4-phenyl-piperazine is prepared by reacting the above free compound with picric acid in the presence of ethanol.

*Example 17*

A mixture of 5.95 g. of 4-(4-acetyl-2-methoxy-phenyloxy)-butyl-amine and 5.45 g. of N,N-di-(2-chloroethyl)-N-phenyl-amine in 50 ml. of methanol is refluxed in the presence of an excess of potassium carbonate for fifteen hours while stirring. The solid material is filtered off, the filtrate is concentrated under reduced pressure, and the residue, representing the 1-[4-(4-acetyl-2-methoxy-phenyloxy)-butyl]-4-phenyl-piperazine is treated with a concentrated solution of hydrogen chloride in ethyl acetate to yield the 1-[4-(4-acetyl-2-methoxy-phenyloxy)-butyl]-4-phenyl-piperazine dihydrochloride, M.P. 205° (with decomposition) after recrystallization from ethanol.

The starting material used in the above procedure is prepared as follows: A mixture of 30.8 g. of 4-(4-bromo-butyloxy)-3-methoxy acetophenone and 22.0 g. of potassium phthalimide in 50 ml. of N,N-dimethylformamide is refluxed for two hours in the presence of a few crystals of potassium iodide as a catalyst. The warm solution is poured onto crushed ice; the organic material is extracted with chloroform, and the extract is washed with a 1 N aqueous solution of potassium hydroxide, 0.5 N aqueous hydrochloric acid and water. After drying over sodium sulfate, the organic solution is concentrated to dryness under reduced pressure. The residue is treated with 200 ml. of methanol containing 20 ml. of hydrazine hydrate (99–100%) and refluxed for two hours. The solution is cooled, acidified with concentrated hydrochloric acid and again refluxed thirty minutes. After filtration, it is taken to dryness under reduced pressure, and the residue is dissolved in a minimum amount of water. The aqueous solution is made strongly alkaline with an aqueous solution of potassium hydroxide, salted with potassium carbonate and extracted with diethyl ether. The organic extract is dried and concentrated under reduced pressure to yield the 4-(4-acetyl-2-methoxy-phenyloxy)-butyl-amine, which is used in the subsequent step without further purification.

The N,N-di-(2-chloroethyl)-N-phenyl-amine used in the above procedure is prepared by heating a mixture of aniline and ethylene oxide in a sealed tube and converting in the resulting N,N-di-(2-hydroxyethyl)-N-phenyl-amine, the hydroxyl groups into chloro by treatment with thionyl chloride.

*Example 18*

A mixture of 12.1 g. of N-[4-(4-acetyl-2-methoxy-phenyloxy)-butyl]-N,N-di-(2-chloroethyl)-amine and 3.1 g. of aniline in 50 ml. of methanol is refluxed in the presence of an excess of sodium carbonate for several hours while stirring. The solid material is filtered off, the filtrate is evaporated to dryness, and the residue, representing the 1-[4-(4-acetyl-2-methoxy-phenyloxy)-butyl]-4-phenyl-piperazine, is converted into its dihydrochloride, M.P. 205° (with decomposition) as described before.

The starting material used in the above procedure is prepared as follows: A mixture of 13.0 g. of 4-(4-acetyl-2-methoxy-phenyloxy)-butyl-amine and 4.5 g. of ethylene oxide is heated in a sealed tube at 90–150° for several hours. The reaction product is extracted with ethanol, and the organic solution is carefully concentrated under reduced pressure to yield the N-[4-(4-acetyl-2-methoxy-phenyloxy) - butyl] - N,N - di-(2-hydroxy-ethyl)amine, which is used without further purification.

To a suspension of 12.5 g. of powdered phosphorus pentachloride in 50 ml. of dry chloroform is added 17.1 g. of N-[4-(4-acetyl-2-methoxy-phenyloxy)-butyl]-N,N-di-(2-hydroxyethyl)-amine while cooling. After refluxing for one hour, the resulting solution is poured onto ice, the chloroform layer is separated, dried and concentrated under reduced pressure to yield the N-[4-(4-acetyl-2-methoxy - phenyloxy) - butyl] - N,N-di-(2-chloroethyl)-amine, which is used without further purification.

*Example 19*

A mixture of 11.2 g. of N-[4-(4-acetyl-2-methoxy-phenyloxy)-butyl]-N'-phenyl-ethylenediamine and 5.9 g. of ethylene bromide in 70 ml. of n-butanol containing a trace of water is refluxed for seventeen hours. After concentrating under reduced pressure, the residue is dissolved in diethyl ether, filtered, washed twice with water, dried and evaporated. The residue, representing the desired 1 - [4 - (4-acetyl-2-methoxy-phenyloxy)-butyl]-4-phenyl-piperazine, is converted into its dihydrochloride, M.P. 205° (with decomposition).

The starting material used in the above procedure is prepared as follows: A mixture of 30.6 g. of N-phenyl-ethylenediamine and 7.5 g. of 4-(4-acetyl-2-methoxy-phenyloxy)-butyl bromide in 150 ml. of ethanol is refluxed for 24 hours. After cooling and filtering, the solution is concentrated under reduced pressure, the residue is taken up in aqueous sodium hydroxide and extracted with benzene. The organic extract is dried and concentrated under reduced pressure to yield the desired N - [4-(4-acetyl-2-methoxy-phenyloxy)-butyl]-N'-phenyl-ethylenediamine, which is used in the next step without further purification.

*Example 20*

The following compounds are prepared according to the previously-described procedure by selecting the appropriate starting materials:

| Acyl-phenyl-X-lower alkyl halide | N-Monocyclic aryl diaza-cycloalkane | N-(Acyl-phenyl-X-lower alkyl)-N'-monocyclic aryl-diaza-cycloalkane |
| --- | --- | --- |
| 4-(4-bromo-butyloxy)-3-methoxy-acetophenone | 1-(3-methoxyphenyl)-piperazine. | 1-[4-(4-acetyl-2-methoxyphenyloxy)-butyl]-4-(3-methoxy-phenyl)-piperazine. |
| 4-(3-chloro-propyloxy)-acetophenone | 1-(2-bromo-phenyl)-piperazine. | 1-[3-(4-acetyl-phenyloxy)-propyl]-4-(2-bromo-phenyl)-piperazine. |
| 4-(2-chloro-ethyloxy)-propiophenone | 1-phenyl-piperazine. | 4-phenyl-1-[2-(4-propionyl-phenyloxy)-ethyl-]piperazine. |
| 4-(2-chloro-ethyloxy)-3-methyl-acetophenone | 1-(2-pyridyl)-piperazine. | 1-[2-(4-acetyl-2-methyl-phenyloxy)-ethyl]-4-(2-pyridyl)-piperazine. |
| 4-(2-chloro-ethyloxy)-3-methoxy-acetophenone | 1-phenyl-1,4-diaza-cyclo-heptane. | 1-[2-(4-acetyl-2-methoxy-phenyloxy)-ethyl]-4-phenyl-1,4-diaza-cycloheptane. |
| 4-(4-bromo-butyloxy)-3-methoxy-acetophenone | 1-phenyl-2-methyl-piperazine. | 1-[4-(4-acetyl-2-methoxy-phenyloxy)-butyl]-3-methyl-4-phenyl-piperazine. |
| 4-chloro-4'-(2-chloro-ethyloxy)-benzophenone | 1-phenyl-piperazine. | 1-{2-[4-(4-chloro-benzoyl)-phenyloxy]-ethyl}-4-phenyl-piperazine. |
| 4-(2-chloro-ethyloxy)-4'-methyl-benzophenone | 1-(4-methoxy-phenyl)-piperazine. | 4-(4-methoxy-phenyl)-1-{2-[4-(4-methyl-benzoyl)-phenyloxy]-ethyl}-piperazine. |
| 4-(5-bromo-pentyloxy)-3-chloro-acetophenone | 1-(3-trifluoro-methyl-phenyl)-piperazine. | 1-[5-(4-acetyl-2-chloro-phenyloxy)-pentyl]-4-(3-trifluoromethyl-phenyl)-piperazine. |
| 2-(2-methoxy-4-nicotinoyl-phenyloxy)-ethyl chloride. | 1-(3,4-dichlorophenyl)-piperazine. | 4-(3,4-dichloro-phenyl)-1-[2-(2-methoxy-4-nicotinoyl-phenyloxy)-ethyl]-piperazine. |
| 4-(2-chloro-ethyloxy)-3-methoxy-acetophenone | 1-phenyl-1,5-diaza-cyclo-octane. | 1-[2-(4-acetyl-2-methoxy-phenyloxy)-ethyl]-5-phenyl-1,5-diaza-cyclo-octane. |
| 4-(2-chloro-ethyl-mercapto)-acetophenone | 1-(3-methyl-phenyl)-piperazine. | 1-[2-(4-acetyl-phenyl-mercapto)-ethyl]-4-(3-methyl-phenyl)-piperazine. |
| 4-(4-bromo-butyl-mercapto)-3-methoxy-acetophenone. | 1-(2-methoxy-phenyl)-piperazine. | 1-[4-(4-acetyl-2-methoxy-phenyl-mercapto)-butyl]-4-(2-methoxy-phenyl)-piperazine. |

*Example 21*

Pharmaceutical compositions containing a compound of this invention are generally prepared according to methods used in the art of manufacturing pharmaceutical compositions, essentially by combining specified proportions of the pharmacologically active ingredient with a pharmaceutically acceptable organic or inorganic carrier. Usually, the compositions of this invention are made up to have from about 1 percent to about 50 percent by weight of the pharmacologically active ingredient in the composition. In compositions for oral use (e.g. tablets, capsules and the like), the percentage by weight is from about 5 percent to at most 50 percent of the pharmacologically active ingredient. In compositions prepared for injection (e.g. solutions and the like), the percentage by weight is from about 1 percent to about 20 percent of the active ingredient.

In preparing pharmaceutically acceptable dosage unit forms, any one of a wide variety of preparations may be manufactured, such as tablets, capsules, pills, suppositories, solutions, suspensions and the like. In addition to the pharmacologically active component, there are present additional substances commonly employed in the art of manufacturing pharmaceutically acceptable dosage unit compositions. These may include excipients, binders, fillers, lubricants, solvents, stabilizers, wetting agents, emulsifiers, buffers, and/or other pharmaceutically acceptable excipients, such as those mentioned previously.

Tablets, each containing 0.05 g. of 1-[4-(4-acetyl-2- methoxy-phenyloxy)-butyl]-4-phenyl-piperazine dihydrochloride, are prepared as follows (for 500,000 tablets):

Ingredients: G.
- 1 - [4 - (4 - acetyl - 2 - methoxy - phenyloxy) - butyl] - 4 - phenyl - piperazine dihydrochloride _____ 25,000.0
- Lactose, spray dried _____ 106,845.0
- Corn starch _____ 3,850.0
- Corn starch (for paste) _____ 2,860.0
- Confectioners sugar _____ 10,000.0
- Stearic acid _____ 1,445.0
- Purified water, q.s.
- Alcohol, anhydrous 3A, q.s.

The 1 - [4 - (4 - acetyl - 2 - methoxy - phenyloxy) - butyl]-4-phenyl-piperazine dihydrochloride is mixed with an equal portion of lactose; the mixture is passed through a No. 16 screen on a Fitzmill at medium speed and placed into a mixer. The remainder of the lactose, the 3,850.0 g. of corn starch, the confectioners sugar and the stearic acid are added, and the powder is mixed for twenty minutes. The 2,860.0 g. of corn starch is suspended in cold water and a paste is formed by diluting the mixture with 14,000 ml. of boiling water. The paste is then added to the dry powder mixture to form the granulate; granulation is completed by adding 1,000 ml. of a 1:1-mixture of the 3A alcohol and water. The wet mass is passed through a No. 5 screen on the Fitzmill at low speed, dried on trays at about 43° and then broken on a No. 12 screen. The granulate is compressed into tablets weighing 0.3 g., using 11/32 inch dies and standard concave punches.

Tablets, each containing 0.05 g. of 1-[4-(4-acetyl-2-methoxy - phenyloxy) - butyl] - 4 - phenyl - piperazine hydrochloride, are prepared as follows (for 100,000 tablets):

Ingredients: G.
- 1 - [4 - (4 - acetyl - 2 - methoxy-phenyloxy) - butyl] - 4 - phenyl - piperazine hydrochloride _____ 5,000.0
- Lactose, spray dried _____ 21,369.0
- Corn starch _____ 770.0
- Corn starch (for paste) _____ 572.0
- Confectioners sugar _____ 2,000.0
- Stearic acid _____ 289.0
- Purified water, q.s.
- Alcohol, anhydrous 3A, q.s.

The tablets are prepared according to the above described procedure.

Capsules, each containing 0.03 g. of 1-[4-(4-acetyl-2 - methoxy - phenyloxy) - butyl] - 4 - phenyl - piperazine dihydrochloride, are prepared as follows (for 40,000 capsules):

Ingredients: G.
- 1 - [4 - (4 - acetyl - 2 - methoxy - phenyloxy) - butyl] - 4 - phenyl - piperazine dihydrochloride _____ 1,200.0
- Corn starch _____ 700.0
- Magnesium stearate _____ 105.0
- Lactose _____ 11,995.0

All ingredients are thoroughly mixed; the mixture is passed through a No. 30 screen, again mixed for an additional thirty minutes and then filled on an encapsulating machine into No. 2 clear, hard gelatine capsules, each containing 0.35 g. of material.

Capsules, each containing 0.03 g. of 1-[4-(4-acetyl-2-methoxy - phenyloxy) - butyl] - 4 - phenyl - piperazine hydrochloride, are prepared as follows (for 100,000 capsules):

Ingredients: G.
- 1 - [4 - (4 - acetyl - 2 - methoxy - phenyloxy) - butyl] - 4 - phenyl - piperazine hydrochloride _____ 3,000.0
- Corn starch _____ 1,750.0
- Magnesium stearate _____ 262.5
- Lactose _____ 29,987.5

The capsules are prepared according to the procedure described above.

Tablets, each containing 0.025 g. of 1-[4-(4-acetyl-2-methoxy-phenyloxy)-butyl]-4-phenyl-piperazine dihydrochloride, are prepared as follows (for 1,000 tablets):

Ingredients: G.
- 1 - [4 - (4 - acetyl - 2 - methoxy - phenyloxy)-butyl] - 4 - phenyl - piperazine dihydrochloride _____ 25.00
- Tragacanth _____ 5.00
- Lactose _____ 97.50
- Talcum _____ 7.50
- Corn starch _____ 12.50
- Stearic acid _____ 1.25
- Magnesium stearate _____ 1.25

The 1 [4 - (4 - acetyl - 2 - methoxy-phenyloxy) - butyl]-4-phenyl-piperazine dihydrochloride is passed through a No. 30 screen, mixed with the tragacanth and lactose in a mixing machine and granulated with water. The granules are dried at 25°, passed through a No. 16 screen and mixed with the talcum, corn starch, stearic acid and magnesium stearate. The mix is compressed into tablets each weighing 0.15 g., using 11/32 inch standard concave punches.

A solution for injection, containing per ml. 0.02 g. of 1 - [4 - (4 - acetyl - 2 - methoxy-phenyloxy) - butyl] - 4-phenyl-piperazine dihydrochloride, is prepared as follows (for 1,000 ml.):

Ingredients:
- 1 - [4 - (4 - acetyl - 2 - methoxy - phenyloxy) - butyl] - 4 - phenyl - piperazine dihydrochloride _____ g__ 20.00
- Sodium chloride _____ g__ 7.07
- Water for injection, q.s. _____ ml__ 1000.00

The 1-[4-(4-acetyl-2-methoxy-phenyloxy)-butyl]-4-phenyl-piperazine dihydrochloride is dissolved in 950 ml. of water for injection, the solution is heated to 40°, and the sodium chloride is added. The solution is cooled to 25°, and the volume is brought to 1000.00 ml. by adding the necessary amount of water. Throughout the procedure asceptic techniques are used, and the solution is filtered through a sterile filter into a 2,000 ml. flask, and 2.2 ml. o fthe solution is filled into 2 ml. amber ampules which are sealed and inspected.

A solution for injection, containing 0.025 g./ml. of 1 - [4 - (4 - acetyl - 2 - methoxy - phenyloxy) - butyl] - 4-phenyl-piperazine hydrochloride, is prepared as follows (for 5,000 ml.):

Ingredients:
- 1 - [4 - (4 - acetyl - 2 - methoxy - phenyloxy) - butyl] - 4 - phenyl - piperazine dihydrochloride _____ g__ 125.00
- Sodium chloride _____ g__ 35.35
- Water for injection, q.s. _____ ml__ 5000.00

The solution is prepared as described above.

Capsules, each containing 0.03 g. of 1-[4-(4-acetyl-2-methoxy - phenyloxy) - butyl] - 4-(2-methoxy-phenyl)-piperazine dihydrochloride, are prepared as follows (for 20,000 capsules):

Ingredients: G.
- 1 - [4 - (4 - acetyl - 2-methoxy-phenyloxy)-butyl] - 4 - (2 - methoxy-phenyl)-piperazine dihydrochloride _____ 600.0
- Corn starch _____ 350.0
- Magnesium stearate _____ 52.5
- Lactose _____ 5997.5

The capsules are prepared as described above.

Tablets, each containing 0.03 g. of 1-[4-(4-acetyl-2-methoxy - phenyloxy) - butyl] - 4-(2-methoxy-phenyl)- piperazine dihydrochloride, are prepared as follows (for 1,000,000 tablets):

Ingredients: G.
1 - [4 - (4 - acetyl-2-methoxy-phenyloxy)-butyl] - 4 - (2-methoxy-phenyl)-piperazine dihydrochloride _____ 30,000.0
Lactose, spray dried _____ 233,690.0
Corn starch _____ 7,700.0
Corn starch (for paste) _____ 5,720.0
Confectioners sugar _____ 20,000.0
Stearic acid _____ 2,890.0
Purified water, q.s.
Alcohol, anhydrous 3A, q.s.

The tablets are prepared as described above.

*Example 22*

A solution of 6.1 g. of 4-(4-bromo-butoxy)-3-methoxy-acetophenone and 8.9 g. of 1-(2,5-dimethoxy-phenyl) piperazine in 40 ml. of ethanol is refluxed for 20 hours. The reaction mixture is evaporated to dryness and the residue partitioned between diethyl ether and water. The ether solution is washed twice with water and after drying over anhydrous sodium sulfate it is evaporated to dryness. The residue is dissolved in ethyl acetate and the solution made strongly acidic by the addition of a solution of hydrogen chloride in ethyl acetate. The solid formed is filtered off and after two recrystallizations from methanol there are obtained 4.3 g. of 1-[4-(4-acetyl-2-methoxy - phenyloxy) - n - butyl] - 4-(2,5-dimethoxy-phenyl)-piperazine dihydrochloride of the formula

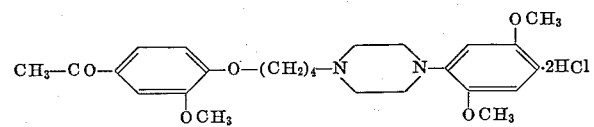

melting at 206° with decomposition.

*Example 23*

A solution of 5.8 g. of 4 - (3 - bromo-propoxy)-3-methoxy-acetophenone and 8.9 g. of 1-(2,4-dimethoxy-phenyl)-piperazine in 40 ml. of ethanol is refluxed for 18 hours. The reaction mixture is evaporated to dryness and the residue partitioned between diethyl ether and water. The ether solution is washed twice with water and after drying over anhydrous sodium sulfate it is evaporated to dryness. The residue is dissolved in ethyl acetate and the solution made strongly acidic by the addition of a solution of hydrogen chloride in ethyl acetate. The crude dihydrochloride formed is filtered off and converted into the monohydrochloride on treatment with a small volume of water. After one recrystallization from ethanol there are obtained 4.0 g. of 1-[3-(4-acetyl-2 - methoxy - phenyloxy) - n-propyl]-4-(2,4-dimethoxy-phenyl)-piperazine monohydrochloride of the formula

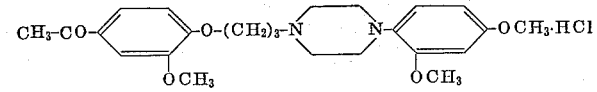

melting at 181–183°.

*Example 24*

A mixture of 5.0 g. of 4 - (3 - bromo-propoxy)-3-methoxy-acetophenone, 3.8 g. of 1 - (2,6 - dimethoxy-phenyl)-piperazine, 1.85 g. of anhydrous sodium carbonate and 25 ml. of ethanol is stirred and refluxed for 20 hours. After cooling to room temperature the insoluble material is filtered off and the filtrate is worked up as described in Example 22. After two recrystallizations from ethanol there are obtained 5.0 g. of 1-[3-(4-acetyl-2-methoxy - phenyloxy) - n - propyl] - 4-(2,6-dimethoxy-phenyl)-piperazine dihydrochloride of the formula

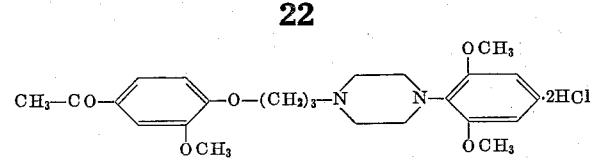

melting at 186–190°.

*Example 25*

A solution of 4.7 g. of 4'-(4-bromo-butoxy)-3'-methoxy-propiophenone and 5.8 g. of 1-(2-methoxy-phenyl)-piperazine in 20 ml. of ethanol is refluxed for 24 hours. After cooling, the reaction mixture is filtered and concentrated in vacuo. The residue is partitioned between diethyl ether and water and the ether solution is washed, dried and concentrated. The residue is taken up in ethyl acetate and the mixture is combined with a solution of hydrogen chloride in ethyl acetate. The precipitate formed is filtered off and recrystallized twice from ethanol to yield the 3'-methoxy-4'-{4-[4-(2-methoxy-phenyl)-piperazino]-butoxy}-propiophenone dihydrochloride of the formula

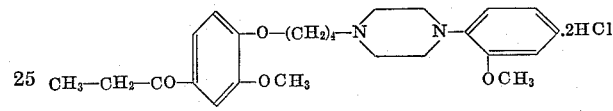

melting at 206–208° with decomposition.

In the analogous manner the 3'-methoxy-4'-[4-phenyl-piperazino]-butoxy-propiophenone dihydrochloride of the formula

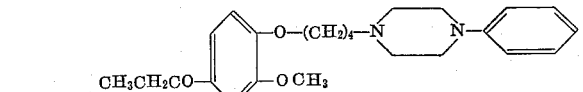

M.P. 186–188°, is prepared.

The starting material can be obtained as follows: 4.8 g. of sodium hydroxide pellets are dissolved in 70 ml. of ethanol and a solution of 21.6 g. of 4'-hydroxy-3'-methoxy-propiophenone in 80 ml. of ethanol is added, followed by a solution of 39 g. of 1,4-dibromobutane in 40 ml. of ethanol. The reaction mixture is stirred at reflux for 2½ hours. After standing at room temperature over night it is filtered and concentrated in vacuo. The residue is dissolved in 50 ml. of chloroform, the solution washed with N sodium hydroxide and water, dried and concentrated. The residue is distilled under reduced pressure and the fraction boiling at 174–180° and 1 mm. Hg, representing the desired 4'-(4-bromo-butoxy) - 3' - methoxy-propiophenone, is collected.

*Example 26*

2.5 g. of 4'-(4-bromo-butoxy)-3'-methoxy-butyrophenone are reacted with 2.9 g. of 1-(2-methoxy-phenyl)-piperazine in 10 ml. of ethanol according to the method given in Example 25. There is obtained the 3'-methoxy-4' - {4 - [4 - (2 - methoxy-phenyl)-piperazino]-butoxy}-butyrophenone dihydrochloride of the formula

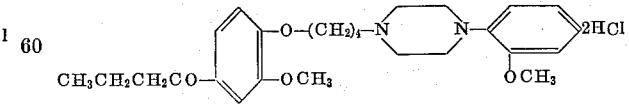

melting at 196–200° with decomposition.

The starting material is prepared by using 15 g. of 4'-hydroxy-3'-methoxy-butyrophenone, dissolved in 40 ml. of ethanol, and reacting it with 3 g. of sodium hydroxide in 40 ml. of ethanol, followed by 22 g. of 1,4-dibromo-butane in 25 ml. of ethanol and carrying out the reaction and isolation as in Example 25. The 4'-(4-bromo-butoxy)-3'-methoxy-butyrophenone boils at 180–190° and 0.2 mm. Hg.

*Example 27*

A solution of 4.6 g. of 3'-chloro-4'-(4-bromo-butoxy)-acetophenone and 4.9 g. of 1-phenyl-piperazine in 20 ml.

of ethanol is refluxed for 24 hours and worked up as described in Example 25. There is obtained the 3'-chloro-4'[4-(4-phenylpiperazino)-butoxy]-acetophenone dihydrochloride of the formula $$CH_3-CO-\underset{Cl}{\underset{|}{C_6H_3}}-O-(CH_2)_4-N\underset{}{\diagdown}N-C_6H_4 \cdot 2HCl$$

melting at 202–206°.

*Example 28*

A solution of 4.7 g. of 4'-(4-bromo-butoxy)-3'-ethoxy-acetophenone and 4.9 g. of 1-phenyl-piperazine or 6.0 g. of 1-(2-methoxy-phenyl)-piperazine in 20 ml. of ethanol is refluxed for 24 hours and worked up as described in Example 25. There are obtained the 3'-ethoxy-4'-[4-(4-phenyl-piperazino)-butoxy]-acetophenone dihydrochloride of the formula $$CH_3-CO-\underset{OC_2H_5}{\underset{|}{C_6H_3}}-O-(CH_2)_4-N\underset{}{\diagdown}N-C_6H_5 \cdot 2HCl$$

melting at 171–174°, and the 3'-ethoxy-4'-{4-[4-(2-methoxy - phenyl) - piperazino] - butoxy} - acetophenone dihydrochloride of the formula $$CH_3-CO-\underset{OC_2H_5}{\underset{|}{C_6H_3}}-O-(CH_2)_4-N\underset{}{\diagdown}N-\underset{OCH_3}{\underset{|}{C_6H_4}} \cdot 2HCl$$

melting at 198–200°, respectively.

The 4' - (4 - bromo - butoxy)-3'-ethoxy-acetophenone is prepared by reacting a solution of 15.4 g. of 3'-ethoxy-4'-hydroxy-acetophenone in 50 ml. of ethanol with 3.5 g. of sodium hydroxide in 50 ml. of ethanol and 27.5 g. of 1,4-dibromobutane in 25 ml. of ethanol, refluxing the reaction mixture for 2¼ hours and working it up as described in Example 25. The 4'-(4-bromo-butoxy)-3'-ethoxy-acetophenone boils at 180° and 0.7 mm. Hg.

*Example 29*

A solution of 4.3 g. of 4'-(4-bromo-butoxy)-3'-methyl-acetophenone and 5.8 g. of 1-(2-methoxy-phenyl)-piperazine or 4.9 g. of 1-phenyl-piperazine in 20 ml. of ethanol is refluxed for 24 hours and worked up as described in Example 25. There are obtained the 3'-methyl-4'-{4 - [4 - (2 - methoxy - phenyl) - piperazino] - butoxy}-acetophenone dihydrochloride, of the formula $$CH_3-CO-\underset{CH_3}{\underset{|}{C_6H_3}}-O-(CH_2)_4-N\underset{}{\diagdown}N-\underset{OCH_3}{\underset{|}{C_6H_4}} \cdot 2HCl$$

melting at 214–216° with decomposition, and the 3'-methyl-4'-[4-(4-phenyl-piperazino)-butoxy]-acetophenone dihydrochloride of the formula $$CH_3-CO-\underset{CH_3}{\underset{|}{C_6H_3}}-O-(CH_2)_4-N\underset{}{\diagdown}N-C_6H_5 \cdot 2HCl$$

melting at 198–202°, respectively.

The starting material is obtained by reacting a solution of 20 g. of 4'-hydroxy-3'-methyl-acetophenone in 100 ml. of ethanol with 5.3 g. of sodium hydroxide in 70 ml. of ethanol and 43 g. of 1,4-dibromobutane in 50 ml. of ethanol and refluxing the mixture for 2 hours. It is worked up as described in Example 25 and yields the 4' - (4 - bromo - butoxy) - 3' - methyl - acetophenone, boiling at 165–175° and 1 mm. Hg.

*Example 30*

A solution of 5.7 g. of 3'-methoxy-4'-[4-(4-phenyl-piperazino) - butoxy] - acetophenone and 4.4 g. of n-butylamine in 20 ml. of ethanol is refluxed for 24 hours. The reaction mixture is evaporated in vacuo to dryness. The residue is dissolved in ethyl acetate, the solution washed with water, dried and concentrated. The residue is again dissolved in ethyl acetate and the solution combined with a solution of hydrogen chloride in ethyl acetate. The precipitate formed is filtered off and recrystallized from a mixture of chloroform and hexane. There is obtained the 1-{4-[4-(1-butylimino-ethyl)-2-methoxy - phenoxy] - butyl}-4-phenyl-piperazine trihydrochloride of the formula $$CH_3-\underset{\underset{N-C_4H_9(n)}{\|}}{C}-\underset{OCH_3}{\underset{|}{C_6H_3}}-O-(CH_2)_4-N\underset{}{\diagdown}N-C_6H_5 \cdot 3HCl$$

melting at 147° with decomposition.

*Example 31*

By using 4.0 g. of 3-methoxy-4'-{3-[4-(2-methoxy-phenyl)-piperazino]-propoxy}-acetophenone and 2.9 g. of n-butylamine in 20 ml. of ethanol according to the method described in Example 30 there is obtained the 1-{3-[4-(1-butylimino-ethyl)-2-methoxy-phenoxy] - propyl} - 4 - (2-methoxy-phenyl)-piperazine trihydrochloride of the formula $$CH_3-\underset{\underset{N-C_4H_9(n)}{\|}}{C}-\underset{OCH_3}{\underset{|}{C_6H_3}}-O-(CH_2)_3-N\underset{}{\diagdown}N-\underset{OCH_3}{\underset{|}{C_6H_4}} \cdot 3HCl$$

melting at 185° with decomposition.

*Example 32*

A solution of 5.7 g. of 3'-methoxy-4'[4-(4-phenyl-piperazino)-butoxy]-acetophenone, 2.1 g. of hydroxylamine hydrochloride and 4.5 ml. of pyridine in 50 ml. of ethanol is refluxed for 24 hours. On cooling the crystallized product is filtered off and recrystallized twice from methanol to yield the oxime of 3'-methoxy-4'[4-(4-phenyl-piperazino)-butoxy]-acetophenone monohydrochloride of the formula $$CH_3-\underset{\underset{NOH}{\|}}{C}-\underset{OCH_3}{\underset{|}{C_6H_3}}-O-(CH_2)_4-N\underset{}{\diagdown}N-C_6H_5 \cdot HCl$$

melting at 188–190°.

*Example 33*

By reacting 4.0 g. of 3'-methoxy-4'-{3-[4-(2-methoxy-phenyl)-piperazino]-propoxy}-acetophenone, 1.4 g. of hydroxylamine hydrochloride, 3 ml. of pyridine and 40 ml. of ethanol according to the method given in Example 32, the oxime of 3'-methoxy-4'-{3-[4-(2-methoxy-phenyl)-piperazino]-propoxy}- acetophenone monohydrochloride, of the formula $$CH_3-\underset{\underset{NOH}{\|}}{C}-\underset{OCH_3}{\underset{|}{C_6H_3}}-O-(CH_2)_3-N\underset{}{\diagdown}N-\underset{OCH_3}{\underset{|}{C_6H_4}} \cdot HCl$$

is obtained. It melts after recrystallization from ethanol at 200–201°.

*Example 34*

6.0 g. of 3'-methoxy-4'-{3-[4-(2,4-dimethoxy-phenyl)-piperazino]-propoxy}-acetophenone are reacted with 1.95 g. of hydroxylamine hydrochloride and 4.2 ml. of pyridine in 55 ml. of ethanol according to the procedure of Example 32, the oxime of 3'-methoxy-4'-{3-[4-(2,4-dimethoxy-phenyl)-piperazino]-propoxy}-acetophenone hydrochloride of the formula

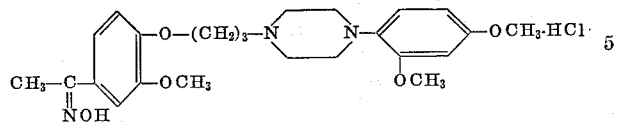

is obtained. It melts after recrystallization from ethanol at 198–200°.

Example 35

6.2 g. of the oxime of 3'-methoxy-4'-{3-[4-(2-methoxyphenyl)-piperazino]-propoxy}-acetophenone hydrochloride are treated with 50 ml. of 2 N sodium hydroxide, the base is extracted with chloroform, the solution is washed with water, dried and concentrated. The crystalline base melts at 144–145°.

4.1 g. thereof are dissolved in 82 ml. of dimethyl formamide and 8 ml. of toluene and 0.5 g. of a 53% suspension of sodium hydride in mineral oil are added. After stirring the mixture for 1 hour at 25°, 1.42 g. of methyl iodide are added. The reaction mixture is stirred at 25° for 4 hours, filtered and the filtrate concentrated in vacuo. The residue is dissolved in ethyl acetate, the solution is washed with water and dried. On addition of a solution of hydrogen chloride in ethyl acetate a precipitate is formed, it is filtered off and recrystallized twice from isopropanol. There is obtained the O-methylether of the oxime of 3'-methoxy-4'-{3-[4-(2-methoxy-phenyl)-piperazino]-propoxy}-acetophenone dihydrochloride of the formula

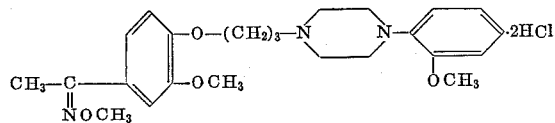

melting at 180–182° with decomposition.

Example 36

The solution of 4.7 g. of 3-methoxy-4'-{3-[4-(2-methoxy-phenyl)-piperazino]-propoxy}-acetophenone and 1.5 g. of anhydrous hydrazine in 25 ml. of ethanol is refluxed for 24 hours. After concentrating it in vacuo, the residue is triturated with water and finally dissolved in ethyl acetate. The solution is washed with water, dried and concentrated. The residue is crystallized twice from isopropanol to yield the hydrazone of 3'-methoxy-4'-{3-[4-(2-methoxy-phenyl)-piperazino]-propoxy}-acetophenone of the formula

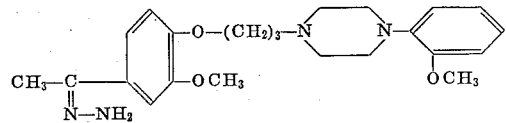

melting at 91°.

The dihydrochloride thereof is prepared from a solution of the base in ethyl acetate solution by adding a solution of hydrogen chloride in ethyl acetate and recrystallizing the precipitate formed from isopropanol, M.P. 257°.

Example 37

After refluxing 2 g. of 3'-methoxy-4'-{3-[4-(2-methoxyphenyl)-piperazino]-propoxy}-acetophenone with 1.1 g. of semicarbazide hydrochloride, 1.6 ml. of pyridine and 5 ml. of water in 20 ml. of ethanol for 2 hours, the solids formed are separated after cooling by filtration and are washed with ethanol and dried. They represent the monohydrochloride of the semicarbazone of 3'-methoxy-4'-{3-[4-(2-methoxy-phenyl)-piperazino] - propoxy}-acetophenone having the formula

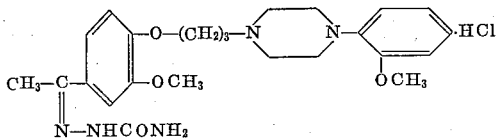

and melting at 248–250°.

Example 38

A mixture consisting of 5.7 g. of 4'-(3-bromo-propoxy)-3'-methoxy-acetophenone, 3.8 g. of 1-(3-methoxyphenyl)-piperazine, 2.1 g. of anhydrous sodium carbonate and 30 ml. of ethanol is refluxed with stirring for 24 hours. The reaction mixture is concentrated and the residue partitioned between water and chloroform. The chloroform solution is dried and concentrated to a small volume. On addition of a solution of hydrogen chloride in ethyl acetate the 3'-methoxy-4'{3-[4-(3-methoxy-phenyl)-piperazino]-propoxy}-acetophenone dihydrochloride of the formula

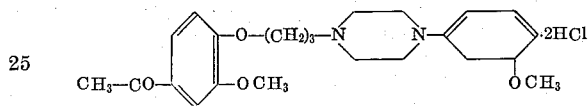

crystallizes and after two recrystallizations from ethanol it melts at 169–172° with decomposition.

Example 39

By using an equal amount of 1-(4-methoxy-phenyl)-piperazine in Example 38, and following the procedure given therein, the 3'-methoxy-4'-{3-[4-(4-methoxy-phenyl)-piperazino]-propoxy-}-acetophenone of the formula

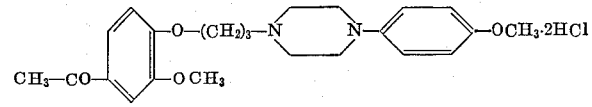

is obtained; it melts after recrystallization from ethanol at 198–201°.

Example 40

A mixture consisting of 5.7 g. of 4'-(3-bromo-propoxy)-3'-methoxy-acetophenone, 4.7 g. of 1-(2-n-butoxyphenyl)-piperazine, 2.1 g. of anhydrous sodium carbonate and 30 ml. of ethanol is refluxed with stirring for 24 hours. The solution is filtered and the filtrate concentrated in vacuo. The residue is partitioned between water and ethyl acetate and the organic solution is dried and concentrated. Upon addition of a solution of hydrogen chloride in ethyl acetate to the ethyl acetate solution of the residue, the 4-{3-[4-(2-n-butoxy-phenyl)-piperazino]-propoxy}-acetophenone dihydrochloride of the formula

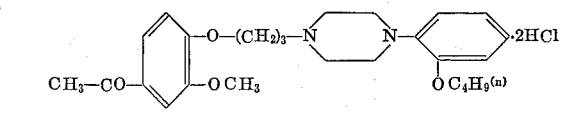

is obtained; it melts at 175–177° with decomposition, after two recrystallizations from ethanol.

Example 41

By using 2.9 g. of 4'-(3-bromo-propoxy)-3'-methoxyacetophenone, 2.1 g. of 1-(2-methylthio-phenyl)-piperazine, 1.0 g. of anhydrous sodium carbonate and 15 ml. of ethanol and following the procedure given in Example 38 the 3'-methoxy-4'-{3-[4-(2-methylthio-phenyl)-piperazino]-propoxy}-acetophenone dihydrochloride of the formula

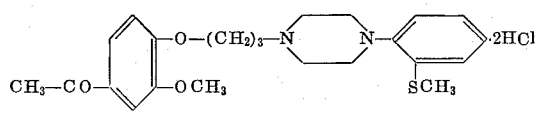

is obtained; it melts at 181–183° after recrystallization from ethanol.

*Example 42*

A mixture consisting of 5.7 g. of 4'-(3-bromo-propoxy)-3'-methoxy-acetophenone, 3.3 g. of 1-(2-pyridyl)-piperazine, 2.1 g. of anhydrous sodium carbonate and 30 ml. of ethanol is refluxed with stirring for 20 hours and worked up as described in Example 25. There is obtained the 3'-methoxy-4'-{3-[4-(2-pyridyl)-piperazino]-propoxy}-acetophenone dihydrochloride of the formula

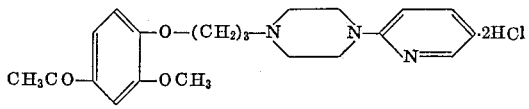

melting at 190° with decomposition after having recrystallized it from methanol.

*Example 43*

By using 2.9 g. of 4'-(3-bromo-propoxy)-3'-methoxy-acetophenone, 1.6 g. of 1-(2-pyrimidinyl)-piperazine, 1.1 g. of anhydrous sodium carbonate and 30 ml. of ethanol, refluxing the mixture for 20 hours and working it up as described in Example 40, the 3'-methoxy-4'-{3-[4-(2-pyrimidinyl)-piperazino]-propoxy}-acetophenone dihydrochloride of the formula

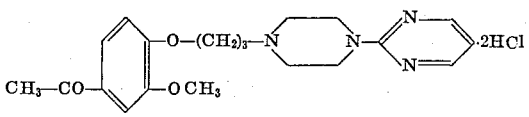

is obtained; it melts at 204–208° after recrystallization from methanol.

*Example 44*

A mixture consisting of 5.0 g. of 4'-(3-bromo-propoxy)-3'-methoxy-acetophenone, 3.8 g. of 1-(3,4-dimethoxy-phenyl)-piperazine, 1.85 g. of anhydrous sodium carbonate and 30 ml. of ethanol is refluxed with stirring for 20 hours and worked up as described in Example 40 to yield the 3'-methoxy-4'-{3-[4-(3,4-dimethoxy-phenyl)-piperazino]-propoxy}-acetophenone dihydrochloride of the formula

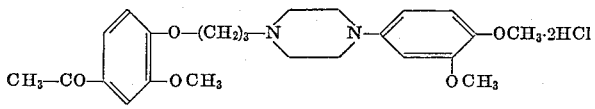

melting at 203–205° after recrystallization from ethanol.

What is claimed is:

1. A member selected from the group consisting of a compound of the formula

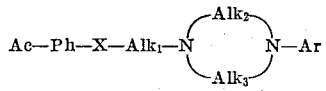

in which Ac is the acyl radical of an organic carboxylic acid selected from the group consisting of lower alkane carboxylic acid, lower alkene carboxylic acid, benzene carboxylic acid, phenyl-lower alkane carboxylic acid, phenyl-lower alkene carboxylic acid, pyridine carboxylic acid, pyridyl-alkane carboxylic acid and pyridyl-alkene carboxylic acid, Ph is a member selected from the group consisting of phenylene, phenylene substituted by lower alkoxy, phenylene substituted by lower alkyl and phenylene substituted by halogen, X is a member selected from the group consisting of oxygen and sulfur, $Alk_1$ is lower alkylene having two to seven carbon atoms and separating the group X from the nitrogen atom by two to five carbon atoms, each of $Alk_2$ and $Alk_3$ is alkylene having from two to seven carbon atoms and separating the two nitrogen atoms by two to three carbon atoms, and Ar is a member selected from the group consisting of (1) phenyl, (2) phenyl at most disubstituted by a member selected from the group consisting of lower alkyl, lower alkoxy and halogen, (3) pyridyl, (4) furyl and (5) thienyl, and a lower alkylimine, the oxime, an O-lower alkyloxime, the hydrazone, the semicarbazone and the N-oxide thereof, an acid addition salt of these compounds and a lower alkyl quaternary ammonium salt of these compounds.

2. 1-[4-(4-acetyl-2-methoxy-phenyloxy)-butyl]-4-phenyl-piperazine monohydrochloride.

3. 1-[3-(4-acetyl-2-methoxy-phenyloxy)-propyl]-4-(2,4-dimethoxy-phenyl)-piperazine monohydrochloride.

4. A member selected from the group consisting of a compound having the formula

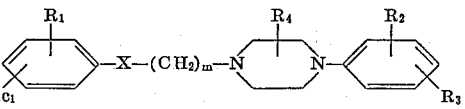

in which $A_{c1}$ stands for a member selected from the group consisting of lower alkanoyl, benzoyl, phenyl-lower alkanoyl, phenyl-lower alkenoyl and pyridoyl, each of the groups $R_1$, $R_2$ and $R_3$ for a member selected from the group consisting of hydrogen, lower alkyl, lower alkoxy and halogeno, X for a member selected from the group consisting of oxygen and sulfur the letter $m$ for an integer from two to six, and $R_4$ for a member selected from the group consisting of hydrogen and methyl, a lower alkylimine, the oxime, O-lower alkyloximes, the hydrazone and semicarbazone thereof and acid addition salts of these compounds.

5. A member selected from the group consisting of a compound having the formula

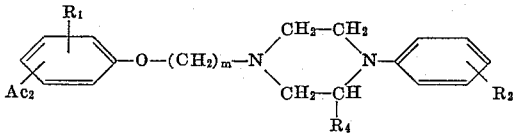

in which $Ac_2$ stands for lower alkanoyl, each of $R_1$ and $R_2$ for a member selected from the group consisting of hydrogen, lower alkyl, lower alkoxy and halogeno, $R_4$ for a member selected from the group consisting of hydrogen and methyl and the letter $m$ for an integer from two to six, a lower alkylimine thereof and acid solution salts of these compounds.

6. A member selected from the group consisting of a compound having the formula shown in claim 3, in which $Ac_2$ stands for acetyl, $R_1$ for lower alkoxy, $R_2$ for a member selected from the group consisting of hydrogen, lower alkyl, lower alkoxy and halogeno, $R_4$ for hydrogen and the letter $m$ for one of the integers from 2 to 4, a lower alkylimine thereof and acid addition salts of these compounds.

7. A member selected from the group consisting of 1-[4-(4-acetyl-2-methoxy-phenyloxy)-butyl]-4-phenyl-piperazine and an acid addition salt thereof.

8. A member selected from the group consisting of 1-[4-(4-acetyl-2-methoxy-phenyloxy)-butyl]-4-(3-methyl-phenyl)-piperazine and an acid addition salt thereof.

9. A member selected from the group consisting of 1-{4-[4-(4-chloro-cinnamoyl)-2-methoxy-phenyloxy]-butyl}-4-phenyl-piperazine and an acid addition salt thereof.

10. A member selected from the group consisting of 1-[4-(4-acetyl-phenyloxy)-butyl]-4-phenyl-piperazine and an acid addition salt thereof.

11. A member selected from the group consisting of 1-[4-(4-phenylacetyl-phenyloxy)-butyl]-4-phenyl-piperazine, and an acid addition salt thereof.

12. A member selected from the group consisting of 1-[4-(4-formyl-2-methoxy-phenyloxy)-butyl]-4-phenyl-piperazine, and an acid addition salt thereof.

13. A member selected from the group consisting of 1-[4-(4-butyryl-2-methoxy-phenyloxy)-butyl]-4-phenyl-piperazine, and an acid addition salt thereof.

14. A member selected from the group consisting of 1-[3-(4-acetyl-2-methoxy-phenyloxy)-propyl]-4-(2-methoxy-phenyl)-piperazine, and an acid addition salt thereof.

15. A member selected from the group consisting of 1-[3-(4-acetyl-2-methoxy-phenyloxy)-propyl]-4-(2,4 - dimethoxy-phenyl)-piperazine, and an acid addition salt thereof.

16. A member selected from the group consisting of 1-[4-(4-propionyl-2-methoxy-phenyloxy) - butyl] - 4 - (2-methoxy-phenyl)-piperazine, and an acid addition salt thereof.

17. A member selected from the group consisting of the oxime of 1-[4-(4-acetyl-2-methoxy - phenyloxy) - butyl]-4-phenyl-piperazine and an acid addition salt thereof.

18. A member selected from the group consisting of the oxime of 1-[3-(4-acetyl-2-methoxy-phenyloxy) - propyl]-4-(2,4-dimethoxy-phenyl) - piperazine and an acid addition salt thereof.

19. A member selected from the group consisting of the hydrazone of 1-[3-(4-acetyl-2-methoxy-phenyloxy)-propyl]-4-(2-methoxy - phenyl) - piperazine and an acid addition salt thereof.

20. A member selected from the group consisting of 1-[3-(4-acetyl-2 - methoxy-phenyloxy) - propyl] - 4 - (2-methyl-mercapto-phenyl)-piperazine, and an acid addition salt thereof.

21. A member selected from the group consisting of 1-[3-(4-acetyl-2-methoxy-phenyloxy)-propyl]-4-(2 - pyridyl)-piperazine, and an acid addition salt thereof.

22. A member selected from the group consisting of 1-[3-(4-acetyl-2-methoxy-phenyloxy)-propyl]-(2 - pyrimidinyl)-piperazine, and an acid addition salt thereof.

References Cited by the Examiner
UNITED STATES PATENTS

| | | | |
|---|---|---|---|
| 3,038,901 | 6/1962 | Hayao et al. | 260—268 |
| 3,067,202 | 12/1962 | Patton et al. | 260—268 |
| 3,106,557 | 10/1963 | Poppelsdorf et al. | 260—268 |
| 3,138,598 | 6/1964 | Speranzo | 260—268 |
| 3,170,926 | 2/1965 | Ash et al. | 260—268 |

ALEX MAZEL, *Primary Examiner.*

HENRY R. JILES, *Examiner.*

JAMES W. ADAMS, JR., *Assistant Examiner.*

UNITED STATES PATENT OFFICE
CERTIFICATE OF CORRECTION

Patent No. 3,277,094　　　　　　　　　　　　　　October 4, 1966

Lincoln Harvey Werner

It is hereby certified that error appears in the above numbered patent requiring correction and that the said Letters Patent should read as corrected below.

Column 30, line 2, after "-propyl]-" insert -- 4- --.

Signed and sealed this 22nd day of August 1967.

(SEAL)
Attest:

ERNEST W. SWIDER　　　　　　　　　　　　　　EDWARD J. BRENNER
Attesting Officer　　　　　　　　　　　　　　Commissioner of Patents